US010954778B2

(12) United States Patent
San Martin et al.

(10) Patent No.: US 10,954,778 B2
(45) Date of Patent: Mar. 23, 2021

(54) LOCATING POSITIONS OF COLLARS IN CORROSION DETECTION TOOL LOGS

(71) Applicant: Halliburton Energy Services, Inc., Houston, TX (US)

(72) Inventors: Luis Emilio San Martin, Houston, TX (US); Reza Khalaj Amineh, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 177 days.

(21) Appl. No.: 15/777,426

(22) PCT Filed: Jul. 26, 2017

(86) PCT No.: PCT/US2017/043953
§ 371 (c)(1),
(2) Date: May 18, 2018

(87) PCT Pub. No.: WO2018/031237
PCT Pub. Date: Feb. 15, 2018

(65) Prior Publication Data
US 2019/0153856 A1   May 23, 2019

Related U.S. Application Data

(60) Provisional application No. 62/374,520, filed on Aug. 12, 2016.

(51) Int. Cl.
*E21B 47/092* (2012.01)
*E21B 33/12* (2006.01)
(Continued)

(52) U.S. Cl.
CPC ............ *E21B 47/092* (2020.05); *E21B 33/12* (2013.01); *E21B 47/002* (2020.05);
(Continued)

(58) Field of Classification Search
None
See application file for complete search history.

(56) References Cited

U.S. PATENT DOCUMENTS

| 4,808,925 A | 2/1989 | Baird |
| 6,003,597 A * | 12/1999 | Newman ............... E21B 43/119 |
| | | 166/55.1 |

(Continued)

OTHER PUBLICATIONS

International Search Report and Written Opinion for Application No. PCT/US2017/043953 dated Nov. 7, 2017.
(Continued)

*Primary Examiner* — Gregory J Toatley, Jr.
*Assistant Examiner* — Brandon J Becker
(74) *Attorney, Agent, or Firm* — John Wustenberg; C. Tumey Law Group PLLC

(57) ABSTRACT

A method and system for location a collar. A method for locating a collar may comprise disposing a logging tool within a plurality of concentric pipes in a wellbore, measuring one or more wellbore parameters, creating a corrosion detection tool log from the measuring one or more wellbore parameters, processing the corrosion detection tool log to determine a location and a position of a plurality of collars on the concentric pipes, and adjusting the corrosion detection tool log to account for the location and position of the plurality of collars. A system for locating a collar may comprise a conveyance line, a logging tool, and an information handling system. The information handling system may be capable to measure one or more wellbore parameters, create a corrosion detection tool log from the measuring one or more wellbore parameters, and document the location and the position of the plurality of collars.

25 Claims, 14 Drawing Sheets

(51) Int. Cl.
  *G05B 19/042* (2006.01)
  *E21B 47/002* (2012.01)
  *E21B 47/113* (2012.01)
  *G01N 17/04* (2006.01)
  *G01V 3/30* (2006.01)

(52) U.S. Cl.
  CPC ............ *E21B 47/113* (2020.05); *G01N 17/04* (2013.01); *G01V 3/30* (2013.01); *G05B 19/042* (2013.01); *G05B 2219/45129* (2013.01)

(56) References Cited

U.S. PATENT DOCUMENTS

| | | | |
|---|---|---|---|
| 8,074,713 B2 * | 12/2011 | Ramos | ................ E21B 47/09 166/255.1 |
| 9,745,845 B2 | 8/2017 | San Martin et al. | |
| 2003/0136195 A1 * | 7/2003 | Krieg | ................ G01N 29/341 73/628 |
| 2006/0173626 A1 * | 8/2006 | McElhinney | ........... E21B 7/061 702/9 |
| 2009/0195244 A1 * | 8/2009 | Mouget | ................ G01V 3/28 324/221 |
| 2011/0290011 A1 | 12/2011 | Dowla et al. | |
| 2013/0056197 A1 | 3/2013 | Maida et al. | |
| 2013/0056202 A1 | 3/2013 | Maida et al. | |
| 2016/0194948 A1 * | 7/2016 | Donderici | ............. E21B 47/092 324/338 |
| 2017/0058662 A1 * | 3/2017 | Blount | ................ E21B 47/092 |
| 2017/0114628 A1 * | 4/2017 | Khalaj Amineh | .... E21B 47/085 |

OTHER PUBLICATIONS

J. Garcia et al., "Successful application of a new electromagnetic corrosion tool for well integrity evaluation in old wells completed with reduced diameter tubular," IPTC 16997, presented in Beijing, China on Mar. 26-28, 2013.

A. A. Arbuzov et al., "Memory magnetic imaging defectoscopy," SPE 162054. Presented in Moscow, Russia on Oct. 16-18, 2012.

* cited by examiner

8 Hz

1 Hz

LOCATING POSITIONS OF COLLARS IN CORROSION DETECTION TOOL LOGS

BACKGROUND

For oil and gas exploration and production, a network of wells, installations, and other conduits may be established by connecting sections of metal pipe together. For example, a well installation may be completed, in part, by lowering multiple sections of metal pipe (i.e., a casing string) into a borehole, and cementing the casing string in place. In some well installations, multiple casing strings are employed (e.g., a concentric multi-string arrangement) to allow for different operations related to well completion, production, or enhanced oil recovery (EOR) options.

Corrosion of metal pipes is an ongoing issue. Efforts to mitigate corrosion include use of corrosion-resistant alloys, coatings, treatments, and corrosion transfer, among others. Also, efforts to improve corrosion monitoring are ongoing. For downhole casing strings, various types of corrosion monitoring tools are available. One type of corrosion detection tool uses electromagnetic (EM) fields to estimate pipe thickness or other corrosion indicators. As an example, an EM logging tool may collect EM log data, where the EM log data may be interpreted to correlate a level of flux leakage or EM induction with corrosion. When multiple casing strings are employed together, correctly managing corrosion detection EM logging tool operations and data interpretation may be complex.

BRIEF DESCRIPTION OF THE DRAWINGS

These drawings illustrate certain aspects of some examples of the present disclosure, and should not be used to limit or define the disclosure.

FIG. 7(*b*) illustrates maximums of the Equation (1) computed for various assumed values for the periodicity.

FIG. 8(*b*) illustrates maximums of the Equation (1) computed for various assumed values for the periodicity.

FIG. 9(*b*) illustrates maximums of the Equation (1) computed for various assumed values for the periodicity.

DETAILED DESCRIPTION

Figure 1:
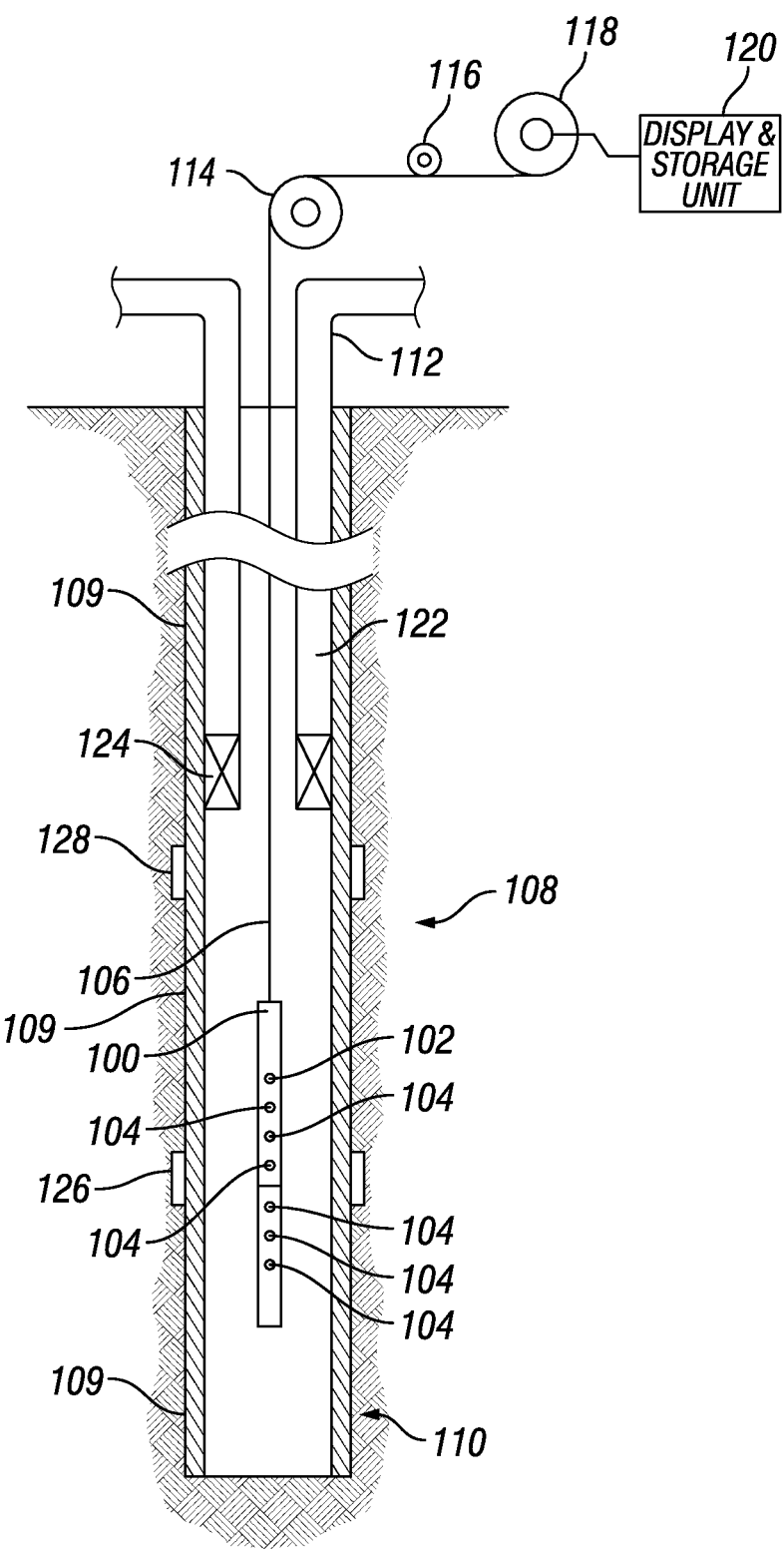
FIG. 1 illustrates an example operating environment for a corrosion detection tool.

This disclosure may generally relate to systems and methods for locating positions of collars in corrosion detection tool logs. A collar may join two sections of pipe. Logging tools, such as corrosion detection tools, may operate to determine corrosion in piping and may further be able to determine the location of collars. In corrosion detection tools, the interpretation of data may be based on differences between responses at nominal sections and responses at defected sections. The differences may be processed to find estimates of thickness change caused by corrosion. Significant changes in signal level may be induced by the presence of collars. At the collars, the thickness may be increased and the processing of data to assess pipe thickness may benefit from knowing the precise locations of the collars in all the pipes of a possible multi-pipe configuration.

Electromagnetic (EM) sensing may provide continuous in situ measurements of parameters related to the integrity of pipes in cased boreholes. As a result, EM sensing may be used in cased borehole monitoring applications. The use of a segmented magnetic core may assist with the optimization of corrosion detection tools by making them less sensitive to a diameter of a first pipe, thus enabling them to operate in configurations of multiple concentric pipes (e.g., five or more). The diameter of the first pipe may vary, for example, from about two inches to about nine inches.

Multi-pipe corrosion detection tools may measure eddy currents to determine metal loss from utilizing magnetic cores at the transmitters. The corrosion detection tools may use pulsed eddy current (time-domain) and may employ multiple (e.g., long, short, and transversal) coils to evaluate multiple types of defects in two or more concentric pipes. The corrosion detection tools may operate in wireline logging. Additionally, a corrosion detection tool may operate on a slick-line. The corrosion detection tool may include an independent power supply and may store the acquired data on memory. A magnetic core disposed in the corrosion detection tool may be used in defect detection in multiple concentric pipes.

Corrosion detection tools may comprise a transmitter-receiver system, wherein the transmitter-receiver system may comprise a transmitter, such as, for example, a solenoid transmitter and a magnetic core. The use of solenoid transmitters with magnetic cores may provide an increased signal for the same amount of current injected in the solenoid transmitter. By using a magnetic core, the inductance of the solenoid transmitter may increase and the same amount of power may be delivered with a fraction of the current, which may be convenient to reduce cross-talk within the corrosion detection tool. The ratio of the currents required with and without the core for the same amount of power, provided the magnetic core does not saturate, may be approximately proportional to the core relative permeability.

In corrosion detection tool applications, the response of the transmitter-receiver system may need to be stable over the range of possible applications. Two areas of concern may be the stability with a variable innermost pipe radius and stability with temperature.

FIG. 1 illustrates an operating environment for a corrosion detection tool 100 as disclosed herein. Corrosion detection tool 100 may comprise transmitter 102 and/or receivers 104. Corrosion detection tool 100 may be operatively coupled to a conveyance line 106 (e.g., wireline, slickline, coiled tubing, pipe, or the like) which may provide mechanical suspension, as well as electrical connectivity, for corrosion detection tool 100. Conveyance line 106 and corrosion detection tool 100 may extend within tubular string 108 to a desired depth within wellbore 110. Conveyance line 106, which may include one or more electrical conductors, may exit wellhead 112, may pass around pulley 114, may engage odometer 116, and may be reeled onto winch 118, which may be employed to raise and lower corrosion detection tool 100 in wellbore 110. Signals recorded by corrosion detection tool 100 may be stored on memory and then processed by display and storage unit 120 after recovery of corrosion detection tool 100 from wellbore 110. Alternatively, signals recorded by corrosion detection tool 100 may be transmitted to display and storage unit 120 by way of conveyance line 106. Display and storage unit 120 may process the signals, and the information contained therein may be displayed for an operator to observe and may be stored for future processing and reference. Display and storage unit 120 may also contain an apparatus for supplying control signals and power to corrosion detection tool 100.

A typical tubular string 108 may extend from wellhead 112 at or above ground level to a selected depth within wellbore 110. Tubular string 108 may comprise a plurality of segments 109, each segment 109 being connected to the adjacent segments 109 by a threaded collar 126. In embodiments, there may be a plurality of collars 126. Collars 126 may attach segments 109 of tubular string 108 together. Collar 126 closest in proximity to wellhead 112 may further be classified as a first collar 128. First collar 128 will be further discussed in detail below.

FIG. 1 also illustrates a typical pipe string 122, which may be positioned inside of tubular string 108 extending part of the distance down wellbore 110. Pipe string 122 may be production tubing, tubing string, casing string, or other pipe disposed within tubular string 108. A packer 124 typically may seal the lower end of the tubing-casing annulus and may secure the lower end of pipe string 122 to tubular string 108. Corrosion detection tool 100 may be dimensioned so that it may be lowered into wellbore 110 through pipe string 122, thus avoiding the difficulty and expense associated with pulling pipe string 122 out of wellbore 110.

In logging systems, such as, for example, logging systems utilizing corrosion detection tool 100, a digital telemetry system may be employed, wherein an electrical circuit may be used to both supply power to corrosion detection tool 100 and to transfer data between display and storage unit 120 and corrosion detection tool 100. A DC voltage may be provided to corrosion detection tool 100 by a power supply located above ground level, and data may be coupled to the DC power conductor by a baseband current pulse system. Alternatively, corrosion detection tool 100 may be powered by batteries located within corrosion detection tool 100, and/or the data provided by corrosion detection tool 100 may be stored within corrosion detection tool 100, rather than transmitted to the surface during logging (corrosion detection). Transmission of electromagnetic fields by transmitter 102 and the recordation of signals by receivers 104 may be controlled by an information handling system.

Systems and methods of the present disclosure may be implemented, at least in part, with an information handling system. An information handling system may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 2:
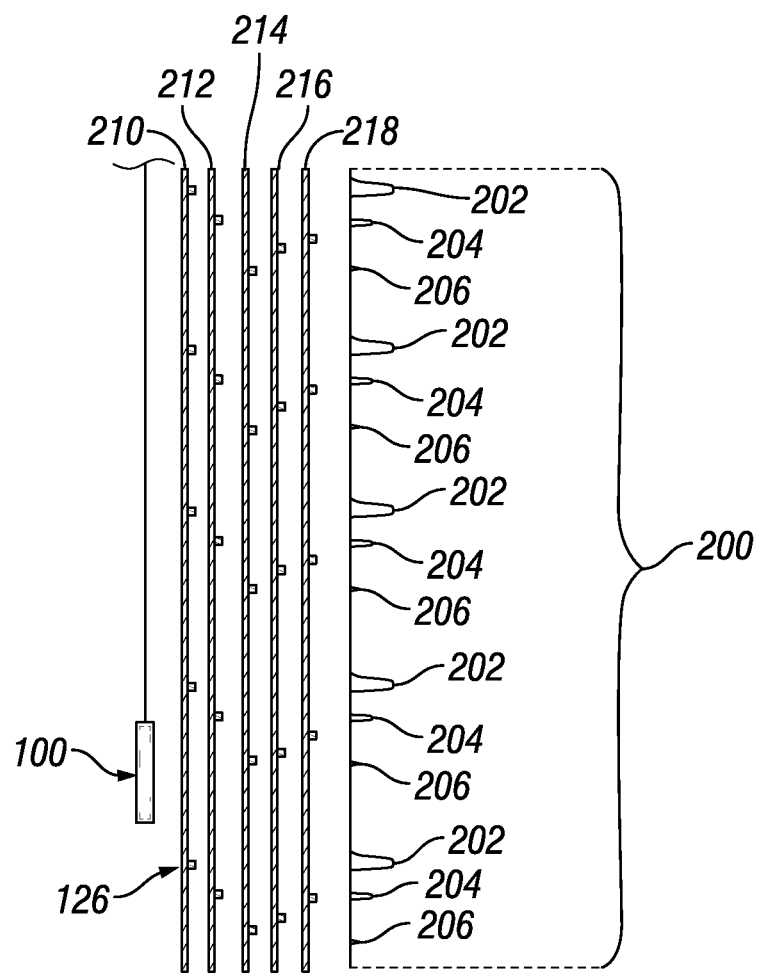
FIG. 2 illustrates an example multi-pipe configuration with collars and defects.
Figure 5:
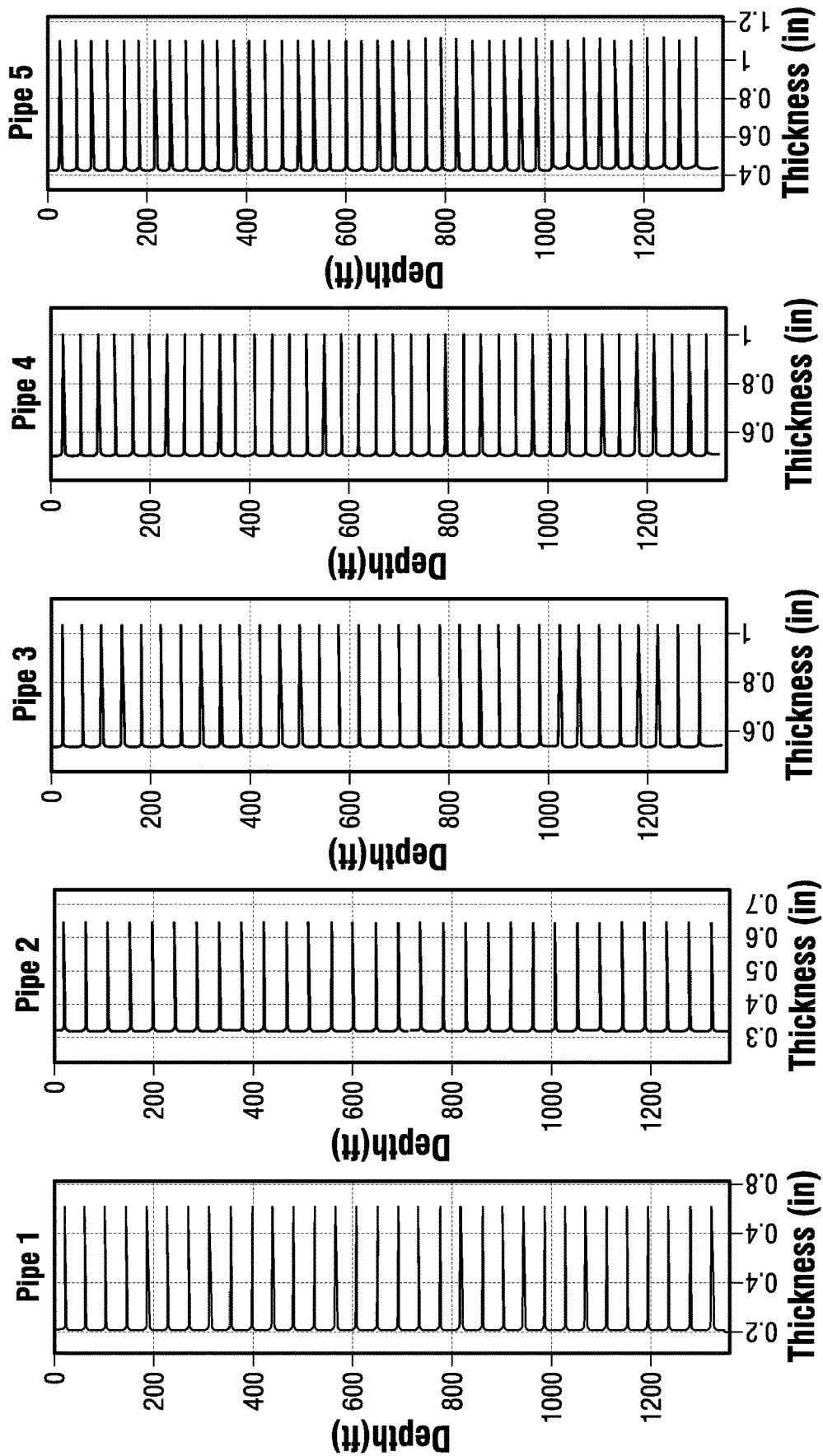
FIG. 5 illustrates an example five pipe configuration.

FIG. 2 illustrates a corrosion detection tool log 200 showing signals of collars 126 obtained via a corrosion detection tool 100 operating in a borehole having multiple concentric pipes (e.g. concentric production tubing, tubing strings, and/or casing strings), wherein each pipe has one or more collars 126. In FIGS. 2 and 5, concentric pipes may be depicted. The measured effect of collars 126 of a first pipe 210, a second pipe 212, and a third pipe 214 in corrosion detection tool log 200 are illustrated at peaks 202, 204, 206, respectively. As illustrated, collars 126 have periodicity as peaks 202, 204, 206 repeat in corrosion detection tool log 200 at regular intervals. In this particular illustration, the signals of the collars 126 of a fourth pipe 216 and a fifth pipe 218 may not be visible in corrosion detection tool log 200. In general, the signals of collars 126 from the outermost pipes, such as fourth pipe 216 and fifth pipe 218 may be hard to identify in a log, such as corrosion detection tool log 200 as illustrated in FIG. 2. The assessment of the thickness of the different pipes in the configuration may benefit from the identification of the position of collars 126, so that the processing, usually an inversion scheme, may benefit from the prior knowledge of the positions of collars 126.

The presence of collars 126 on first pipe 210 may produce a signature that may be clearly seen in corrosion detection tool log 200. One of the first steps in the processing of corrosion detection tool logs, such as corrosion detection tool log 200, may be the identification of the positions of collars 126, which may typically be done by visual identification of the signals of collars 126. This may be done for first pipe 210 and second pipe 212, but for third pipe 214 and/or any subsequent pipes, the identification of the position of collars 126 may not be determined visually.

The present disclosure may include a method to locate the position of collars 126 automatically, making the processing more efficient, even in cases where the signature may by quite small. Once located, the position of collars 126 may be displayed (e.g., using display and storage unit 120 depicted on FIG. 1) for an operator. Without limitation, the display of the position of collars 126 may be in tabular, graphical, schematic, and/or other suitable form for an operator. There may be two different cases that require different approaches. In the first case, lengths of segments 109 that make each of tubular strings 108, either production pipe and/or casing, may be known because they were procured and placed there. In the first case, the method may include one step, in which the position of collars 126 may be searched for.

In the second case it may be assumed that there exists no knowledge of the lengths of segments 109. In the second case, the method may include two steps. In the first step, the length of segments 109 of each tubular string 108 may be searched for. In the second step, the position of collars 126 may be searched for.

When the lengths of segments 109 are not known, it is assumed that collars 126 (referring to FIGS. 1 and 2) in tubular strings 108 (referring to FIG. 1) may be approximately periodic along the length of a well, and in a spatial Fourier transform of the signal recorded by the receivers of a typical eddy current device (frequency domain or time domain), the periodicity may produce a significant component at a spatial frequency corresponding to the period of collars 126 even if visually, the signature of collars 126 may not be easily identifiable.

The typical signal that collars 126 (referring to FIGS. 1 and 2) generate in corrosion detection tool 100 may be approximately known prior because the geometry of segments 109 may be approximately known. Physical properties of tubular string 108, such as electrical conductivity may also be known if the type of steel used is known, but typically, the magnetic permeability may not be known. The typical signal of collars 126 may be simulated for a small number of cases corresponding to a few values of electrical conductivity and a few values of magnetic permeability. Once the positions of collars 126 in different pipes may be found, the signature of collars 126, evaluated from simulations or obtained from the logs, may be used to approximately subtract that signature in the frequency domain from the Fourier transform of the log prior some adjustments, disclosed below. Different embodiments described below may be applied to cases in which the lengths of segments 109 may not be known.

In embodiments in which periods of collars 126 may be known, it may be assumed that the distance between collars 126 in all tubular strings 108 may be known. In such a case, the information about the pipes used in the construction of the well may be sufficiently detailed to identify the periodicity of different tubular strings 108 within the well.

To locate the offset position of collars 126 (referring to FIGS. 1 and 2), for each pipe np (np=1, ..., Np), the sum, denoted by $S^{np}(j)$, of the samples of the response of receiver $R_{nr,nf}$ may be generated, where the sub-indices may indicate the receiver and the frequency used (nr: index corresponding to the number of receiver, nf: index corresponding to the number of frequency), when the samples with periodicity of $T_{np}$ are taken. Because there may be several arrays and several frequencies in each array, the procedure may be repeated for each of them. The signals with sufficient sensitivity to defects in a given tubular string 108 may be used to locate collars 126 in that structure. If it is assumed that the distance between response samples along the log is $\Delta z$, a given position along the well may be identified by a value $j\Delta z$, where j is an integer that varies between j=1, ... M, and M represents the total number of the logging points (total number of samples for $R_{nr,nf}$ along the log), the following sum may be generated:

$$S_{nr,nf}^{np}(j) = \Sigma_n R_{nr,nf}(j\Delta z + nT_{np}) \; n=0, \ldots, N \quad (1)$$

where N is determined such that all $j\Delta z + nT_{np}$ depths may fall within the depth range over which the responses are processed. As indicated, the sum may be a function of the start position $j\Delta z$ and a maximum of this function may be looked for, as the start position changes within $[z_0, z_0+T_{np}]$, where $z_0$ may represent the beginning point for the depth interval. The index j, for which the function $S^{np}(j)$ becomes a maximum, may correspond to the approximately correct beginning position for a first collar on the corresponding pipe and from the known information about the periods of collars 126 (referring to FIGS. 1 and 2), it may be known that collars 126 may be repeating with the given periodicity of $T_{np}$ from that depth on. After the correct locations of collars 126 for the periodicity $T_{np}$ have been found, the signatures of collars 126 may be approximately removed from log 200 by subtracting the typical signal of collars 126 obtained by numerical simulations and/or from the measured signals of collars 126. The subtraction of signals of collars 126 may be helpful for cases in which there may be a degree of overlap of signatures of collars 126 from different tubular strings 108 because after removing larger signals from the inner pipes, the smaller signals of the outer pipes may become easier to locate. In cases where two tubular strings 108 may have similar and/or equal periods, there may be two cases: collars 126 may not overlap in space or collars 126 may overlap in space. If collars 126 do not overlap in space, the sum in Equation (1) may locate more than one maximum. From the expected ratios between peaks of different tubular strings 108, specific pipes involved may be identified. In the second case in which collars 126 may overlap, a possible way to still solve the problem may be to identify the innermost tubular string 108 between these two, and then to subtract the typical signature of collars 126 in the identified tubular string 108. After the subtraction, the signature of collars 126 of second pipe 212 may become visible. When more than two tubular strings 108 have the same period, the method may be analogous.

For pipes with large differences in periodicities and periods of collars 126 (referring to FIGS. 1 and 2) may not be known, the response of a receiver at a particular frequency $R_{nr,nf}$ that contained the responses of collars 126 to all pipes may be considered. It may also be possible to use more than one response to extract the information about the position of collars 126 with receiver 104, that may be defined as a short receiver (20 inches (51 cm) or less transmitter-receiver distance), being preferred to extract information on collars 126 which may be in the inner tubular strings 108 and receiver 104, that may be defined as a longer receiver (30 inches (76 cm), and/or more transmitter-receiver distance) to extract information of outer pipe collars 108.

In the first step, a Fourier transform with respect to the log position (depth) to the signal of receiver 104 (referring to FIG. 1) may be applied. It may be easy to separate the zones that have different number of tubular strings 108, that is, it may be known, due to the large changes in metal thickness, the zones that may have one, two, three, four and/or five pipes.

Additional information may be provided in the well diagram for the number of pipes the well may contain. When looking for information about the period of a given tubular string 108, it may be convenient to use only the length of corrosion detection tool log 200 (referring to FIG. 2) that contains that pipe subject to analysis.

In the Fourier transform, there may be a component representing collars 126 (referring to FIGS. 1 and 2) of every different tubular string 108. The reason for this expectation may be that collars 126 may be approximately periodic. Therefore, collars 126 may generate a significant component in the Fourier transform of corrosion detection tool log 200. The typical ratios of the magnitude of the components representing the signature of collars 126 in different tubular strings 108 may be approximately known provided the number of joints in each barrier and the approximate geometry are known. The properties of the pipes may be assumed to be typical for a given type of steel. If the periodicities of collars 126 belonging to different pipes are sufficiently different and the number of pipes included in corrosion detection tool log 200 being sufficiently large, the Fourier components representing collars 126 in different tubular strings 108 may be distinguishable from each other. Approximate ratios between these components may be used to further identify the periods in the frequency spectrum. Of the multiple receivers 104 (referring to FIG. 1) and multiple frequencies that a frequency domain tool may excite, such as corrosion detection tool log 100, it may be convenient to use in this evaluation for the signals that may be sensitive to tubular string 108 on which collars 126 may be that may be searched for. The short arrays may show more prominently collars 126 of the inner pipes, while the long arrays may show, with sufficient strength for clear assessment, collars 126 of the outer pipes.

From the Fourier transform of $R_{nr,nf}$ spatial periods for collars 126 (referring to FIGS. 1 and 2) of different tubular strings 108 may be extracted. These periodicities may be denoted as $T_{np}$, where np may be the pipe numbers or number of tubular strings 108 (starting from 1 for the inner pipe and increase toward the outer pipes). Even in cases where tubular string 108 may have more than one period because more than one length of segment 109 may have been used in it, if both lengths may have been used in sufficient number, both lengths may be identifiable by this method. The magnitude of the peaks in the frequency spectrum may decrease from the inner pipes toward the outer pipes. It may be important that the appropriate signal, from the multiple frequencies and receivers 104 (referring to FIG. 1), may be selected to carry out the analysis. This may be employed to distinguish the periodicity of collars 126 on individual pipes from:

$$T_{np} = \frac{1}{f_{np}} \quad (1)$$

where $f_{np}$ is the evaluated frequency at which the peak due to the np pipe collars 126 is observed.

Under pipes with large differences in periodicities and periods of collars 126 (referring to FIGS. 1 and 2) not known, it may be disclosed on how to find the periodicity of the pipes from the frequency spectrum when the periodicities of collars 126 on the pipes $T_{np}$ are sufficiently different leading to $N_p$ major peaks in the frequency spectrum. However, if the number of distinct peaks in the frequency spectrum is smaller from the number of pipes $N_p$, it may indicate that two or more tubular strings 108 may have the same and/or similar periodicity of collars 126. Two methods may be used to determine the pipes with similar periodicity of collars 126. In example, corrosion detection tool log 200 (referring to FIG. 2) may consist of a short length (for example about two hundred feet) and the number of segments 109 in corrosion detection tool log 200 may be no more than six and no less than four, a relatively small number compared with the typical numbers in a well.

Figure 3:
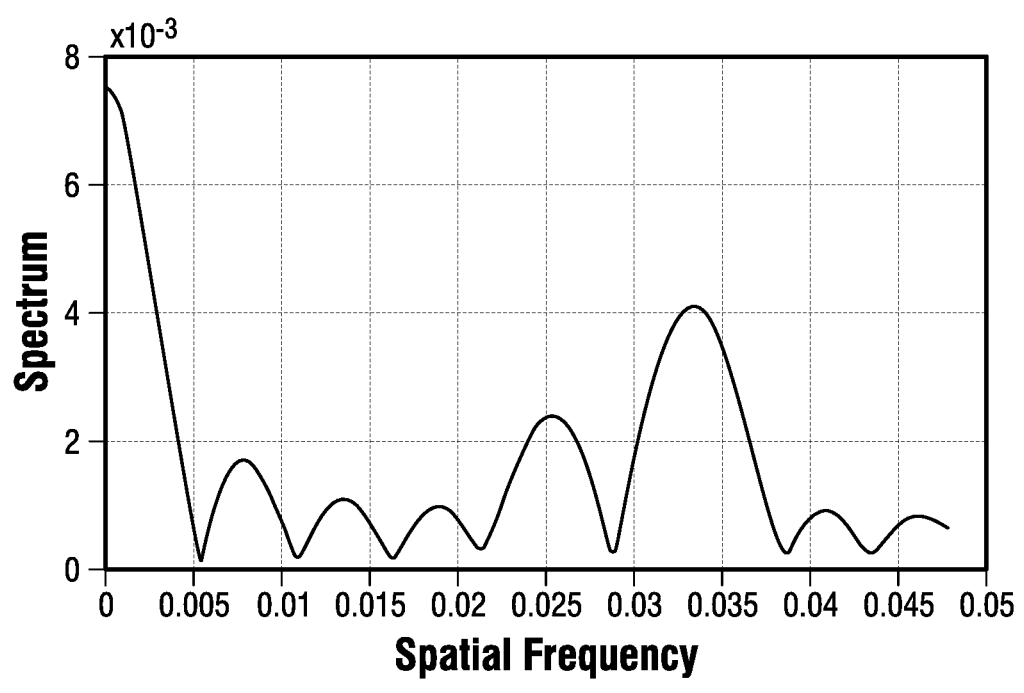
FIG. 3 illustrates an example spatial frequency spectrum of responses.

In an illustrative example, FIG. 3 shows the spatial frequency spectrum for responses measured by a receiver that is 20 inches (51 cm) apart from transmitter 102 (Referring to FIG. 1) and acquisition frequency of 0.5 Hz. It should be understood, however, that the receiver-transmitter spacing on a corrosion detection tool (e.g., spacing of receivers 104 and transmitters 102 on corrosion detection tool 100 depicted on FIG. 1) may vary as desired for particular application, including without limiting spacing of from about 1 inch (2.5 cm) to about 40 inches (102 cm) (or more). In this example, configuration of the concentric pipes may include five magnetic pipes with periodicity of 30 ft (9 m), 40 ft (12 m), 42 ft (13 m), 39 ft (12 m), and 40 ft (12 m) for first pipe 210, second pipe 212, third pipe 214, fourth pipe 216, and fifth pipe 218, respectively. However, it should be understood that the periodicity may vary depending on the particular pipes that were used and may even vary on a particular pipe. While a typical pipe may have segments 109 of about 20 ft (6 m) to about 50 (15 m) with collars 126 (referring to FIGS. 1 and 2) connecting each segment 109, it should be understood that pipes may also having segments 109 outside these ranges. In the spatial frequency spectrum, three major peaks may be observed, one peak may be at frequency zero which may be due to the DC content of the response and may be ignored, and two other major peaks due to collars 126. The largest peak may correspond to the responses of collars 126 on first pipe 210 that have periodicity of 30 ft (9 m). However, since periodicities of collars 126 for the outer pipes may be close, their corresponding peaks may merge into a single peak, making the estimation of the exact individual periodicities for these pipes nearly impossible with the method disclosed above. Below, complementary methods to determine the periodicities of individual pipes in such conditions are disclosed.

For example, in a method when some pipes have similar periodicity, such that their peaks in the spatial frequency spectrum merge together, known knowledge from simulations may be employed to distinguish which pipes may have similar periodicity. By knowing that the magnitude of the peaks in the spectrum corresponding to periodicity of the inner pipes may be larger than the outer pipes and also by knowing the ratios of the magnitudes of the peaks from simulations, it may be possible to determine which metal barriers have similar periodicities and which tubular strings 108 may have different periodicities.

A method to determine the periods of collars 126 (referring to FIGS. 1 and 2) of the pipes when two or more pipes have similar periods may be derived from Equation (1). For this purpose, the period estimations obtained from the frequency spectrum may be employed to compute the sum shown in Equation (1). The maxima of Equation (1) obtained from variable period (varying over a range consistent with the result of the Fourier transform results) may give the periods of each tubular string 108, provided collars 126 do not overlap exactly. For each period considered the maxima may be evaluated when the position j∆z varies within the largest period. For each tubular string 108, one of the maxima corresponds to the true value of the periodicity on that tubular string 108. This process may be implemented for every tubular string 108 for which there is not a certain answer regarding the periodicity of collars 126 from the frequency spectrum method. Assuming that the periodicity for pipe np has been determined to be approximately $T_{np}$ (from the peak in the spectrum), the exact periodicity may be determined by again employing Equation (1) and changing $T_{np}$ within a proper interval around that, i.e. $[T_{np}-\Delta T, T_{np}+\Delta T]$. For any value within this interval, the maximum of Equation (1) may be sought. In examples, the maxima may be found by varying both the period and the position, once the maxima of the signal are found, both the period and the position of collars 126 may be found by this method. Notice that in this case, two tubular strings 108 with identical period may be distinguished if the position of collars 126 is sufficiently different to produce separate maxima.

Once a certain answer is obtained regarding the periodicity of collars 126 (referring to FIGS. 1 and 2) of tubular string 108 (for example, the largest component of the frequency spectrum has been associated with collars 126 on first pipe 210), the signature of collars 126 may be removed, and then the process may be repeated with the next maximum associated to collars 126 of the next tubular string 108. This process may continue until all tubular strings 108 in the problem may be covered.

There may be exceptions in which an alloyed first pipe 210 may give signatures of smaller magnitudes than collars 126 of second pipe 212. But in any case, this situation may be known by running simulations on the typical properties of the pipes known to be present in the well.

Given that the evaluation may be carried out independently for each receiver 104 (referring to FIG. 1) and each acquisition frequency, there may be $N_r \times N_f$ results, and the selection of the final result may be chosen so that the solution may optimize the match for all the possible cases. In particular, collars 126 of the inner pipes may be looked for in the signals of short receivers at relatively high frequencies and the periods of collars 126 of the outer pipes may be looked for in the signals of receivers 104 that may be defined as a long receivers, discussed above, at lower frequencies. The process may involve a weighted average of the results for the different raw curves measured, where the weights account for the different sensitivities to the presence collars 126 from different signals with larger sensitivities accounting for larger weights in the evaluation of periods of collars 126 for a given tubular string 108.

Using higher and lower frequencies: a characteristic of comprising a frequency domain eddy current corrosion detection tool 100 (referring to FIG. 1) may be that the signatures of the outer pipes' collars 126 (referring to FIGS. 1 and 2) are more pronounced at lower frequencies because the attenuation across the pipes may be reduced, as the frequency decreases. In contrast to lower frequencies, at higher frequencies, only the responses due to the features on the inner-most pipes may be acquired. This phenomenon may be employed to first detect the periodicity of collars 126 and position on the inner pipes using higher frequencies. Then, responses at lower frequencies may be employed to estimate the periodicities of collars 126 and positions on the outer pipes. All of the previously described methods may be employed for estimation of the periodicities of collars 126 and positons using either high frequencies or low frequencies. Collars 126 of first pipe 210 may be searched at a high frequency, e.g., 10 Hz or higher, and then collars 126 of the next pipe may be searched at a lower frequency and so on until reaching the outermost pipe.

Figure 4A:
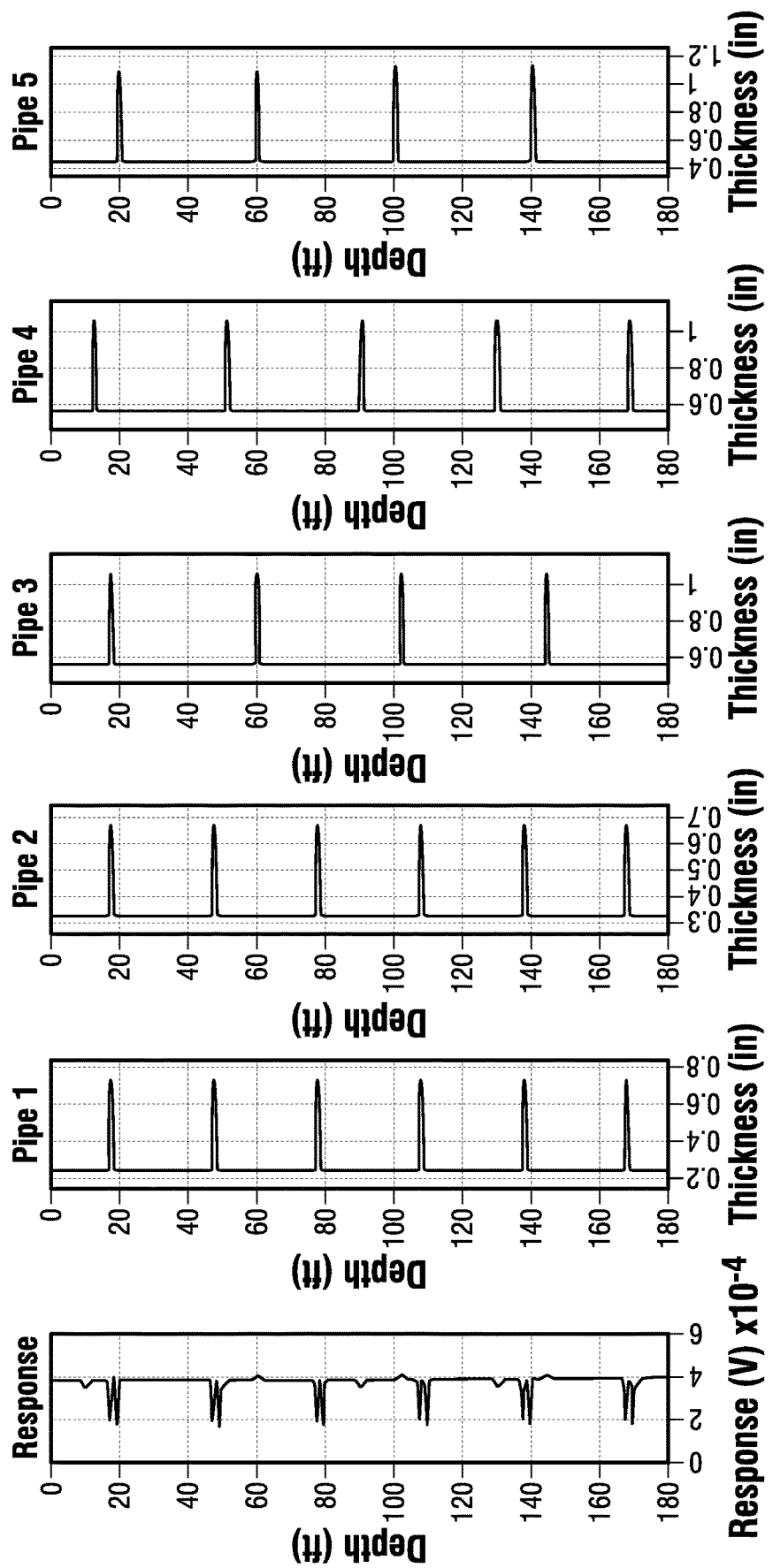
FIGS. 4(*a*) and 4(*b*) illustrate an example of the receiver responses for five pipes configuration at two different frequencies.
Figure 4B:
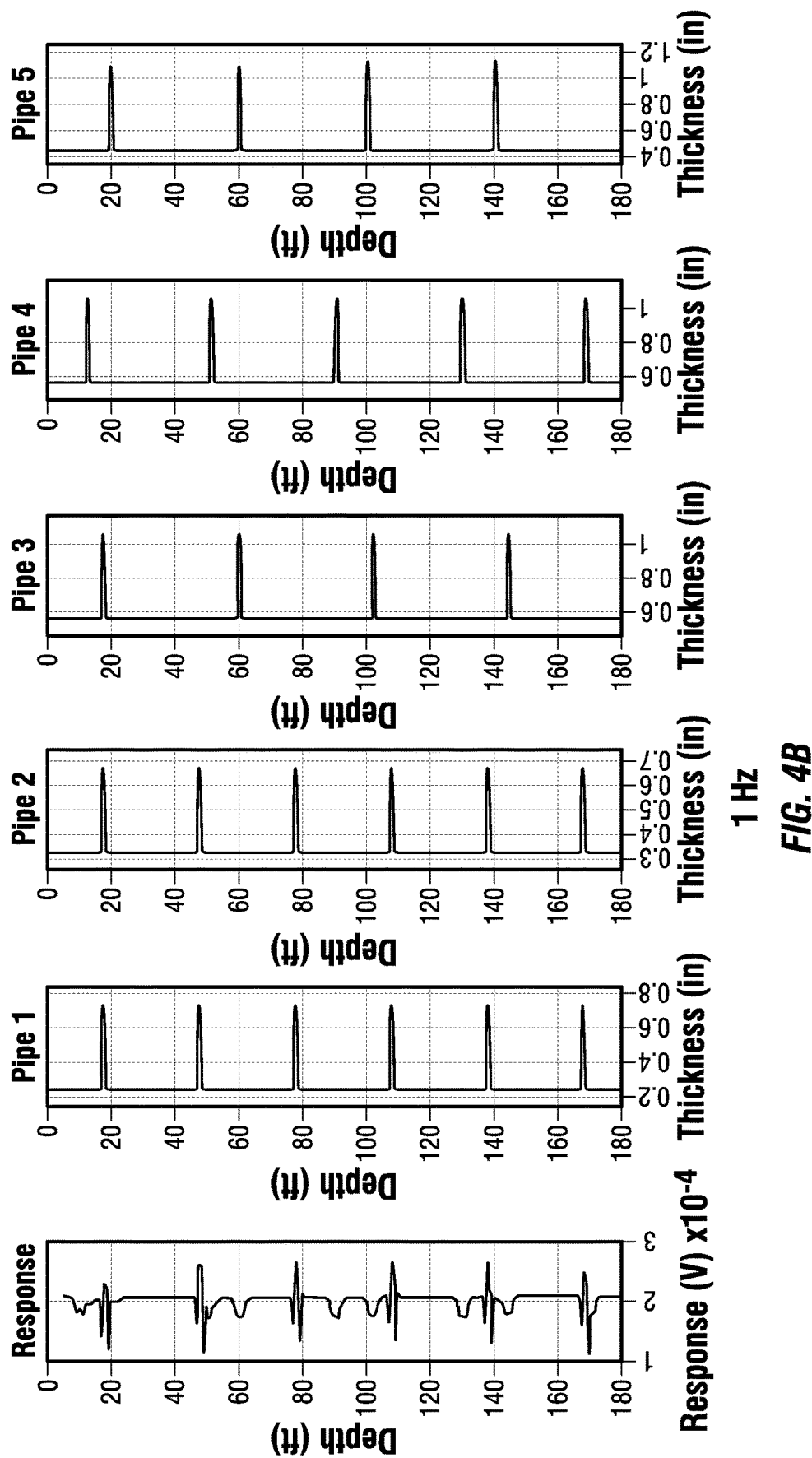

In an illustrative example, FIGS. 4(a) and 4(b) shows sketches of responses of receiver 104 (referring to FIG. 1) for configuration with five concentric pipes at two different frequencies: one relatively higher frequency (8 Hz) with smaller or no signature of the outer pipes' collars 126 and one relatively lower frequency (1 Hz) with larger signature from the outer pipes' collars 126. It also shows the position of collars 126 for each of the five concentric pipes.

For simplicity of implementation, so far, spatial frequency spectrums of the responses have been used to get an initial estimate of the periodicities of the pipes with similar periodicities as well as pipes with different periodicity. However, a numerical inversion may be run to determine, within an interval for periodicity (the interval may be broad enough to cover any possible value for periodicity), the best fit for the positions of collars 126 on each of tubular strings 108. It may be assumed that there are $N_p$ tubular strings 108. The best fit for the inversion may be the distribution of collars 126 that maximizes the sum in Equation (1) for each of the pipes. Global optimization methods may be utilized for inversion. Global optimization may be distinguished from regular optimization by its focus on finding the maximum and/or minimum over all input values, as opposed to finding local minima or maxima. Weighting may be used to solve for the different tubular strings 108. As mentioned above attenuation across the metal may vary with frequency and also different distances between transmitter 102 and receiver 104 (referring to FIG. 1) may be associated with different sensitivity to the presence of collars 126 in different pipes. In another example, may be the use of transmitters 102 of different lengths. Transmitters 102 of different lengths may generate signals with different sensitivity to collars 126 from different tubular strings 108. Tool 100 with multiple frequencies, multiple transmitter-receiver distances and multiple transmitter 102 lengths, the inversion for the periods and location of collars 126 may be run to find both periods and spatial position of collars 126 using appropriate weights to find the period and position of a given tubular string 108.

The inversion may consider multiple receivers 104 (referring to FIG. 1) and multiple frequencies at the same time. Defining the measurement at each frequency and defining each receiver 104 a channel, it may be possible to maximize the values obtained from Equation (1) computed for all the channels simultaneously. Thus, all possible periods and all possible positions of collars 126 in Equation (1) within prior defined ranges within what may be possible for the location of collars 126 may be evaluated. Alternatively, the maximum of the sum in Equation (1) may be found separately for each channel and the results of the periodicities and/or positions of collars 126 may be combined through a weighted sum. In this weighted sum, for estimating parameters of collars 126 of inner pipes, the results obtained from channels corresponding to higher frequencies and shorter transmitter-receiver distances may be boosted via larger weights. On the other hand, for estimating parameters of collars 126 of outer pipes, the results obtained from channels corresponding to lower frequencies and longer transmitter-receiver distances may be boosted via larger weights. The inversion may also have specific receivers 104 and frequencies for specific tubular strings 108 depending on the sensitivity to signals of collars 126 (first pipe 210, second pipe 212, etc.). The signals may be generated by transmitter 102 of different lengths.

Segments 109 that make tubular strings 108 may be produced with a certain tolerance. This tolerance value may be used in the position of each collar 126 to further optimize the inversion, so that once the maximum value has been found (for a fixed period) an additional step to maximize the expression in Equation (1) subject to small variations within tolerance of the position of segments 109 may give a more precise estimate to the locations of collars 126.

As disclosed above, various techniques to find the periods and positions of collars 126 on multiple tubular strings 108 using frequency domain eddy current tools has been disclosed. However, the techniques described above may be adapted to be employed with the time domain eddy current techniques commonly referred to as Pulse Eddy Current (PEC). In PEC techniques, the evaluation of multiple concentric pipes may be performed exciting transmitter 102 (referring to FIG. 1) with a pulse and receiving the decay response from the pipes in receiver 104, such as a coil (a receiver coil may be the same as a transmitter coil since the receiver channel starts recording the decay response after the transmitter pulse is turned off). The time-domain response recorded by receiver 104 may be partitioned and averaged over smaller time intervals (time slots). Responses averaged over earlier time slots may correspond to inner-most pipes while responses averaged over later time slots may correspond to outer-most pipes. Thus, processing the decay responses in consecutive manner, from earlier to later time slots, may be employed to estimate the properties or dimensions of the pipes from inner-most to the outer-most ones, respectively.

Figure 11A:
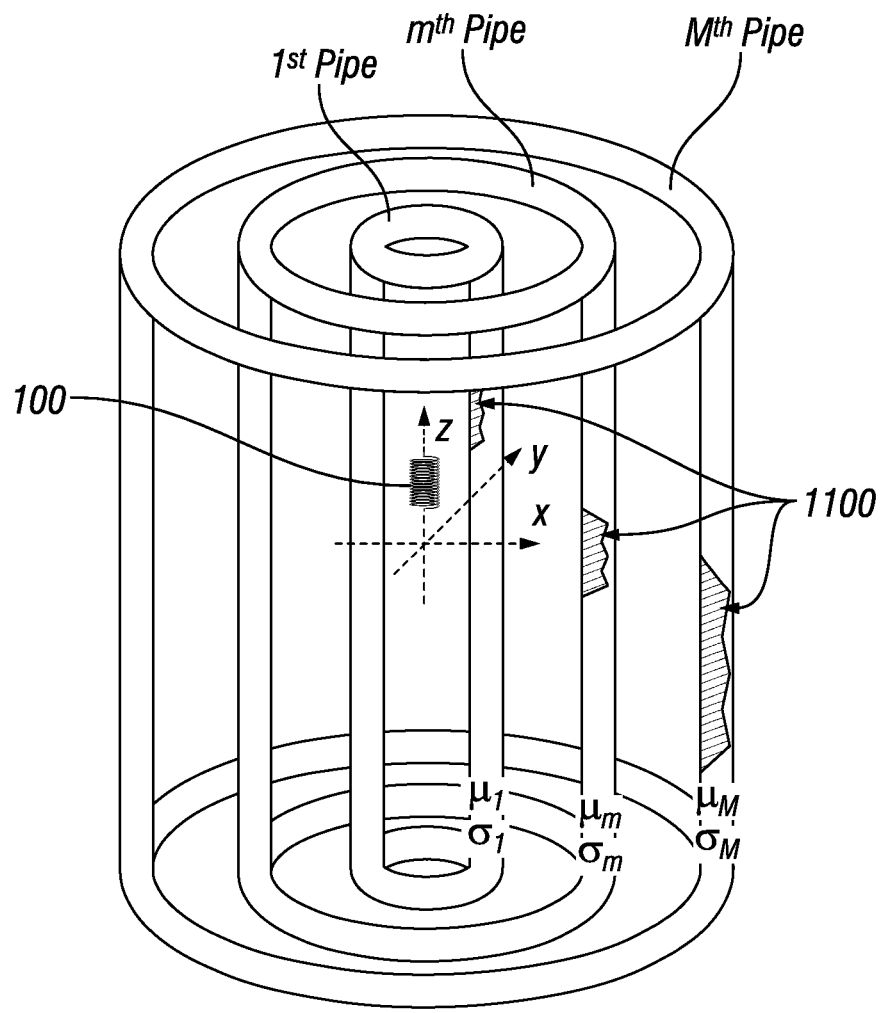
FIG. 11A illustrates the corrosion detection tool disposed within a plurality of tubular strings that may include defects.
Figure 11B:
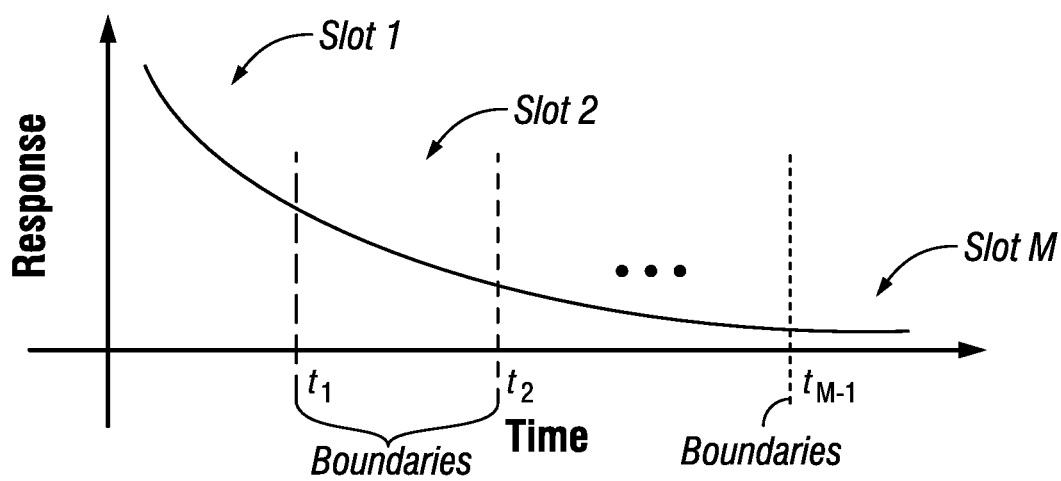
FIG. 11B illustrates an example setup and processed time slots for the evaluation of multiple concentric pipes.
Figure 12A:
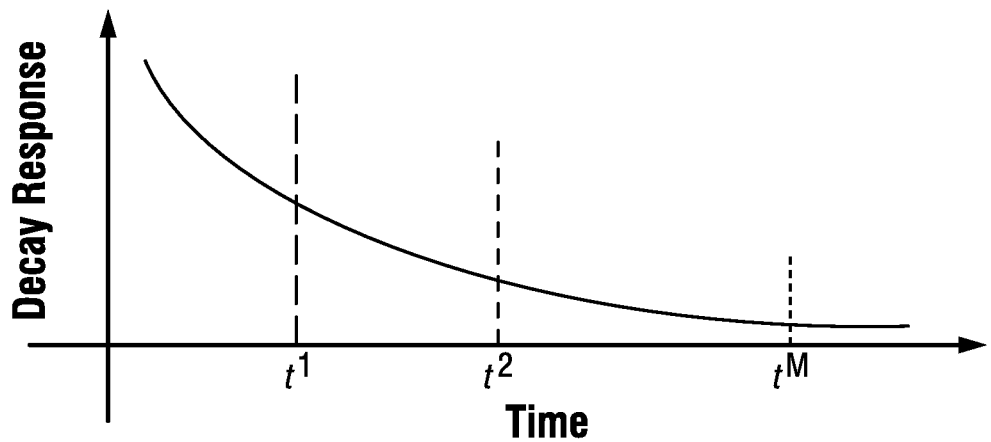
FIG. 12A illustrate the PEC logging and sample decay response that are obtained at various depths.
Figure 12B:
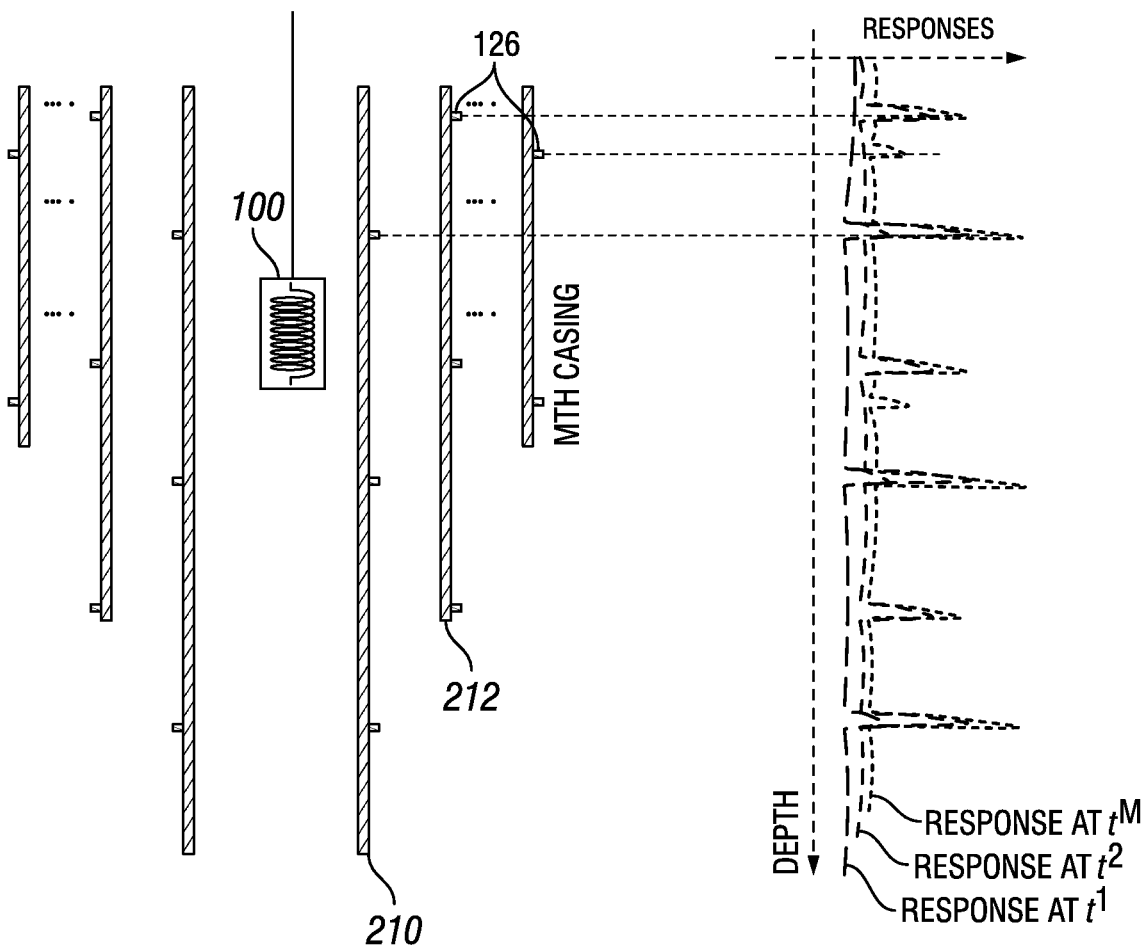
FIG. 12B illustrate the PEC logging and the periodic and sharp changes in the response monitored at particular sample times shown in part (a) due to the presence of collars on the pipes, wherein an effect of collars on outer pipes is observed at later response times.

FIG. 11A illustrates a corrosion detection tool 100 disposed within a plurality of tubular strings 108, wherein at least one of the plurality of tubular string 108 include defects 1100. During operations, corrosion detection tool 100 may record defects 1100 within a decay response. As illustrated in FIG. 11B, when logging, at each depth position, the decay response, in an illustrative example, may be recorded by receiver 104. By monitoring the change in the response at different times along the depth, periodic changes in the response may be detected due to the presence of collars 126 (Referring to FIG. 1). The periodic changes in the response at later times may be attributed to the outer pipes. For example, as illustrated in FIG. 12A and FIG. 12B, by monitoring the change in the response at times $t^1, t^2, \ldots, t^M$, along the depth, periodic sharp variations may be detected in the response that is due to collars 126 on pipes 1, 2, ..., M.

Methods described above may be implemented by taking the PEC responses at one or more late time slots that may include the signatures of collars 126 for all pipes. In example, higher and lower frequency responses may be employed for evaluating collars 126 on the inner and outer pipes, in PEC technique responses of the earlier and later time slots may be employed to evaluate periodicities of collars 126 and positions on the inner and outer pipes.

Figure 6:
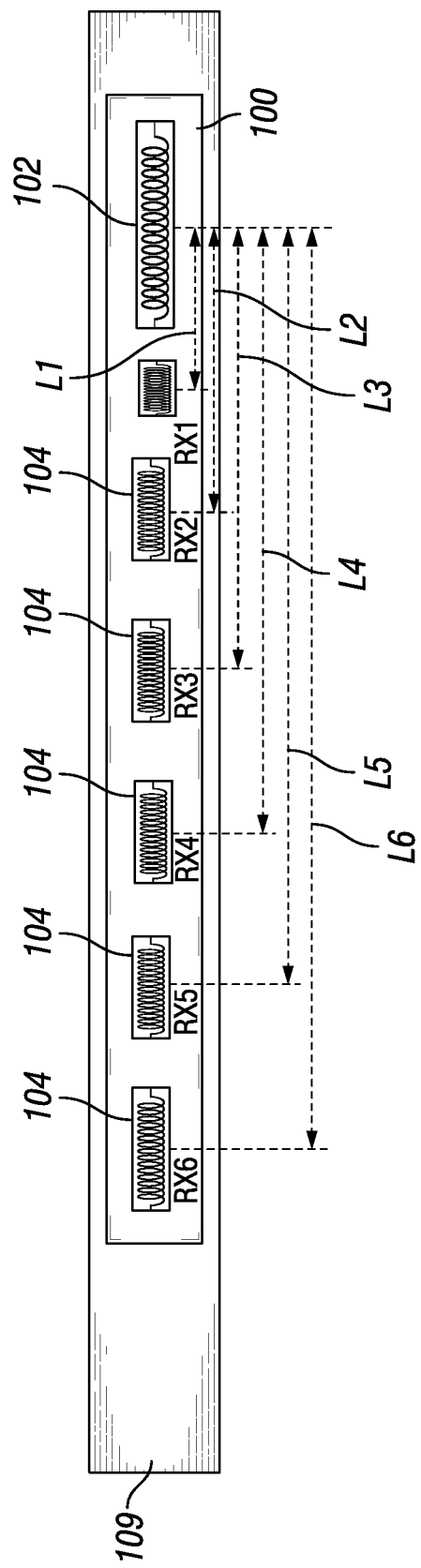
FIG. 6 illustrates an example tool configuration.

As illustrated in FIG. 6, the synthetic results for corrosion detection tool 100 with transmitter 102 and six receivers 104 (referring to FIG. 1) disposed in a segment 109 are considered in the following example. In this example, FIG. 6 shows receivers RX1 to RX6 that are at the distances L1 to L6 to a transmitter 102, i.e. L1<L2<L3<L4<L5<L6. This tool may be employed to log five concentric pipes. Table 1 shows the dimensions of the pipes, for this example, and also the dimensions, periodicity and offsets of collars 126 on the pipes.

TABLE 1

Parameters of the pipes and the collars.

| Pipe No. | Outer diameter | Thickness | Collar periodicity) | Collar offsets from the edge) | Collar length | Collar outer diameter |
|---|---|---|---|---|---|---|
| Pipe 1 | 2⅞ in (7 cm) | 0.217 in (0.6 cm) | 42 ft (13 m) | 20 ft (6 m) | 7 in (18 cm) | 3.875 in (10 cm) |
| Pipe 2 | 7 in (18 cm) | 0.324 in (0.8 cm) | 45 ft (14 m) | 22 ft (7 m) | 9 in (23 cm) | 7.656 in (19 cm) |
| Pipe 3 | 9⅝ in (24 cm) | 0.545 in (1.4 cm) | 40 ft (12 m) | 25 ft (8 m) | 10.5 in (27 cm) | 10.625 in (27 cm) |
| Pipe 4 | 13⅜ in (34 cm) | 0.514 in (1.3 cm) | 35 ft (11 m) | 30 ft (9 m) | 10.5 in (27 cm) | 14.375 in (37 cm) |
| Pipe 5 | 18⅝ in (47 cm) | 0.435 in (1.1 cm) | 32 ft (10 m) | 27 ft (8 m) | 11 in (28 cm) | 20 in (51 cm) |

The distribution of collars 126 in the five pipes is given in FIG. 5. For this example configuration of pipes and collars 126, the response of tool receivers 104 (referring to FIG. 1) was obtained from a numerical simulation.

Figure 7A:
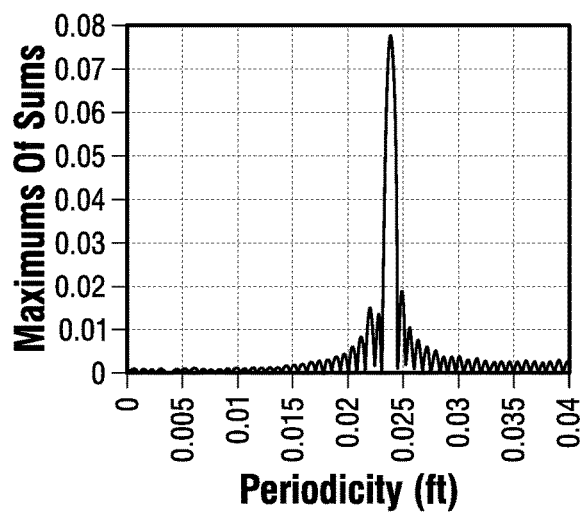
FIG. 7(*a*) illustrates the frequency spectrum using RX1 response.
Figure 7B:
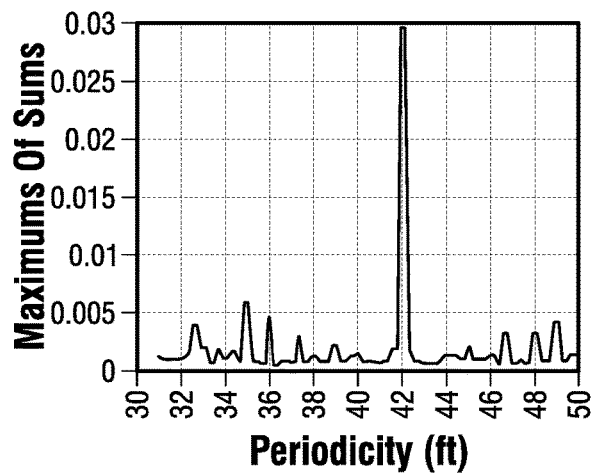
Figure 8A:
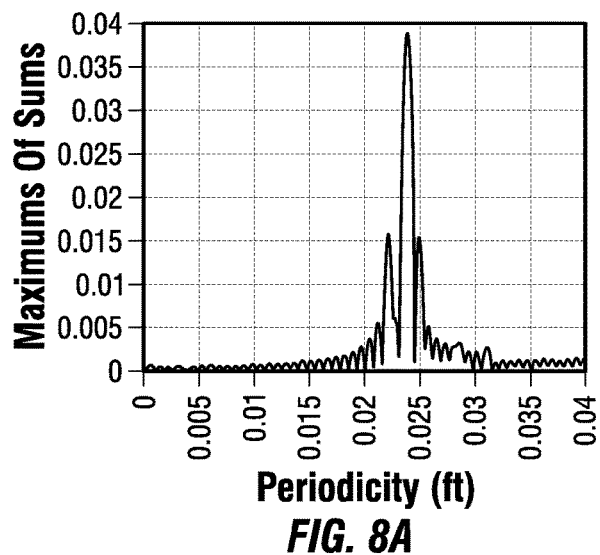
FIG. 8(*a*) illustrates frequency spectrum using RX2 response.
Figure 8B:
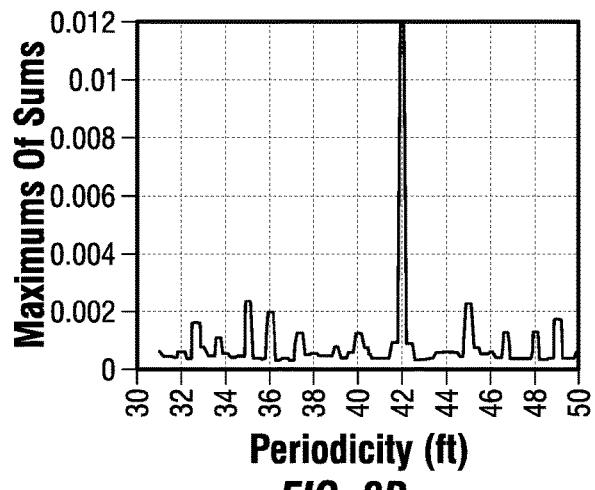
Figure 9A:
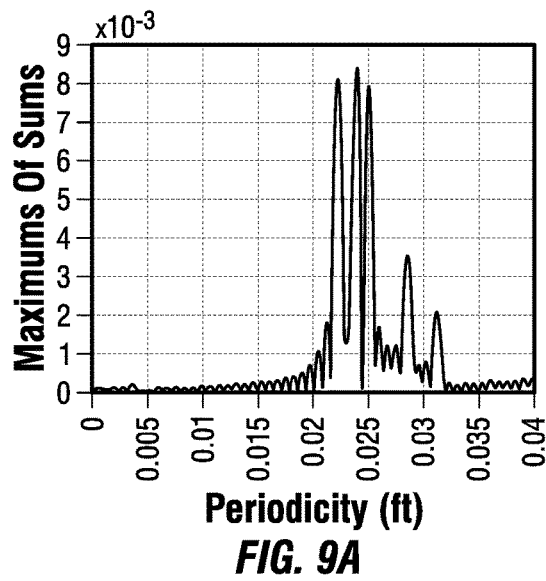
FIG. 9(*a*) illustrate frequency spectrum using RX3 response.
Figure 9B:
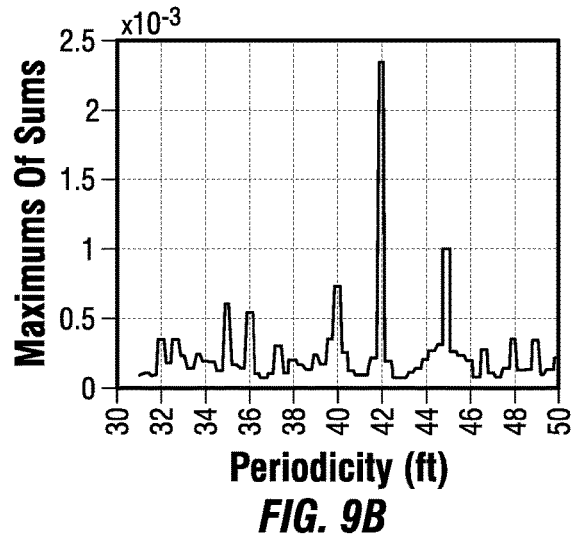
Figure 10A:
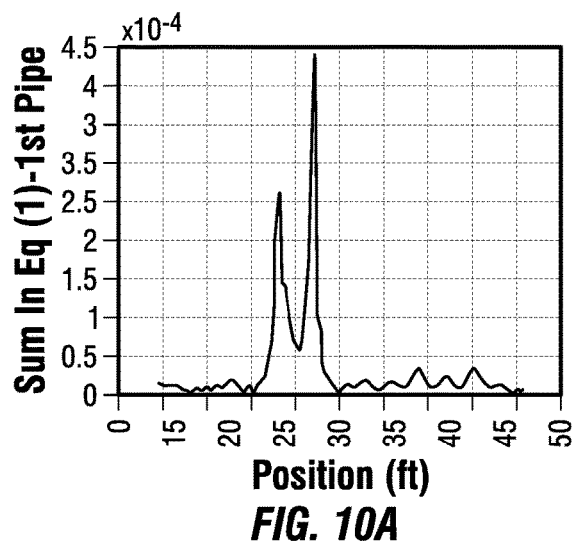
FIG. 10 illustrates a distribution of computed values from Equation (1) to find the offset positions of the collars on each pipe after finding the periodicity of the collars.
Figure 10B:
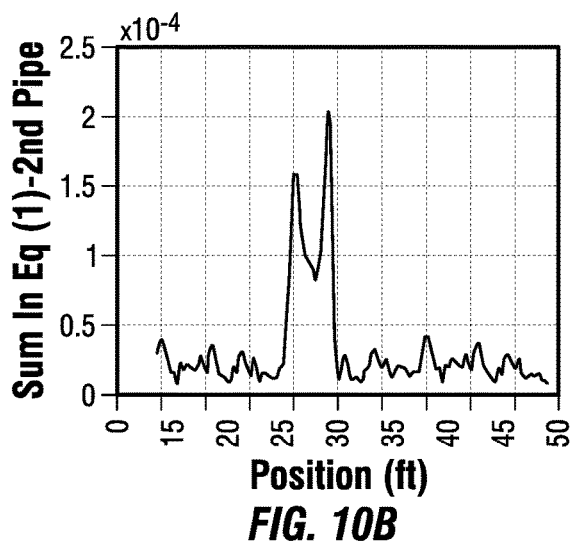
Figure 10C:
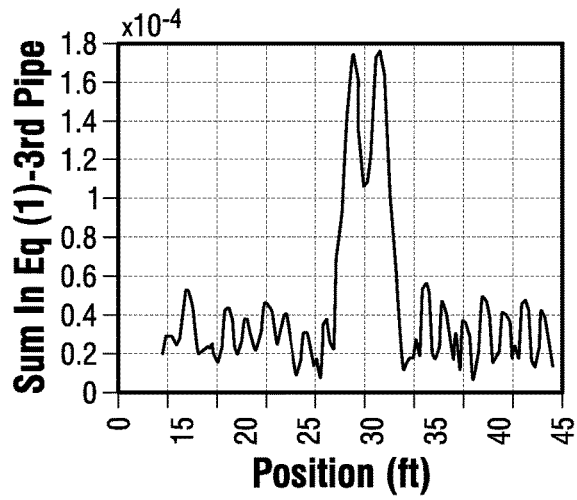
Figure 10D:
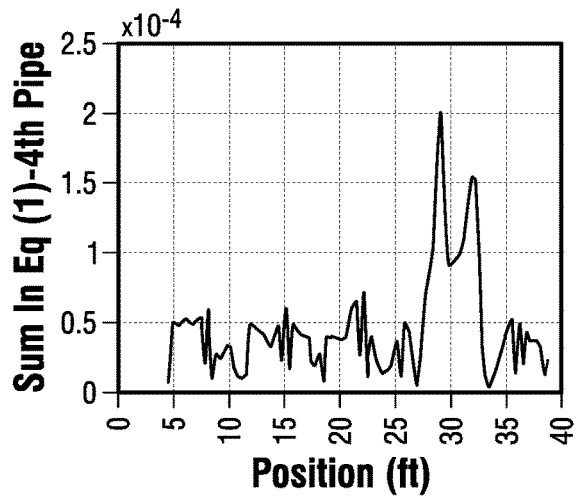
Figure 10E:
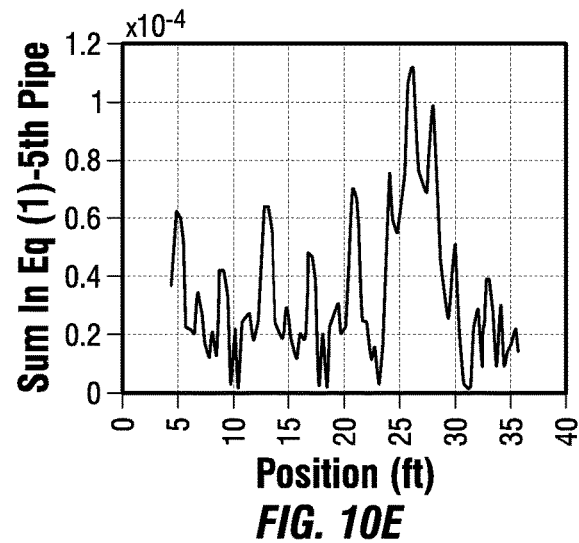

In an illustrative example, FIG. 7(a) depicts the Fourier transform of the response of receiver RX1 of FIG. 6 at 1 Hz. In an illustrative example, the evaluation of the maxima of the sum in Equation (1) is shown in FIG. 7(b) when the period T varies between 30 feet (9 m) and 50 feet (15 m) and the position jΔz may vary within the largest possible period. In FIGS. 8(a) and 8(b), the same plots may be shown for the signal of receiver RX2 at 1 Hz. In FIGS. 9(a) and 9(b), the same plots may be shown for the signal of receiver RX3 at 1 Hz. In FIGS. 7(a), 8(a), and 9(a) different peaks of the Fourier transform correspond to the different periods of the pipes. Most of the peaks in FIGS. 7(b), 8(b), and 9(b) may correspond to the periods of the pipes but there are peaks that do not correspond to real periods. To find the real periods unequivocally it may be convenient to use both methods, real periods appear as the set produced by the intersection of the peaks of both plots. Also important may be the magnitude of the peaks in FIGS. 7(b), 8(b), and 9(b). The largest peak may correspond to the period of first pipe 210, the second largest peak may correspond to the period of second pipe 212, the third largest peak may correspond to the period of third pipe 214, the fourth period may have a smaller peak than that of the third, and the fifth has a smaller period than the fourth. Notice that the peaks and the order may be correct for the signal of RX3 which may be located at 30 inches (76 cm), in an example, from transmitter 102 (referring to FIG. 6). FIG. 10(a)-10(e) illustrate computed values from Equation (1) after finding $T_{np}$ for each pipe for FIGS. 7(a), 7(b), 8(a), 8(b), 9(a), and 9(b).

The way to select the correct receiver 104 to evaluate collars 126 in a given pipe configuration may be assessed from a simulation of the situation in advance of the real log because the well diagram usually contains all the information necessary for this assessment. For the fifth pipe 218 configuration in this example, it may be RX3 that may be sufficiently sensitive to all pipes to have better quality data. In general it may be convenient to search for collars 126 of first pipe 210 in short arrays (e.g., less than 12 inches (30 cm) distance between transmitter 102 and receiver 104) and at high frequencies because those signals have sensitivity mostly to first pipe 210 and second pipe 212 and almost no sensitivity to the subsequent pipes. To detect collars 126 in third pipe 214 and above, receivers 104 further away from transmitter 102 may be preferable. These may be RX3 located at 30 inches (76 cm), in an example, or RX4, RX5, or RX6 located at larger distance from transmitter 102. When searching for collars 126 of third pipe 214, fourth pipe 216, and fifth pipe 218 it may be convenient to use lower frequencies, such as 0.5, 1 or 2 Hz, for example, because these frequencies may be less affected by attenuation across the metal of the pipes.

The algorithm to find the periods may comprise both the Fourier transform peaks and the peaks of the maxima of the sum in Equation (1). The periods from the data in FIGS. 6(a)-(b) and 7(a)-(b) extracted as the point of the peaks on both the Fourier transform and peaks in Equation (1) are approximately at 42 for first pipe 210, 45 for the second pipe 212, 40 for third pipe 214, 35 for fourth pipe 216 and 32 for fifth pipe 218. Periods for fourth pipe 216 and fifth pipe 218 are extracted from the signals of RX3 in FIGS. 7(a)-(b). The association between period and pipe number may be obtained from RX3 were the relative magnitude on the peaks in FIG. 7(b) indicates the pipe number for the corresponding period, with the largest peak corresponding to pipe 1 and the smallest corresponding to pipe 5.

A method to find the position of collars 126 for each of period, for a given period, may be found from the maxima of Equation (1) obtained by varying the index j in the range $[j_0, j_0+T_{np}/\Delta z]$, so that the term $j\ \Delta z$ in Equation (1) varies within the range of position of one full segment 109. This may determine the approximate position of collars 126 associated to each period. To estimate the positions of collars 126 evaluated from FIG. 9 for the different periods, with the position of collar 126 given by the middle point of the double peaked signature are approximately: 20 ft for first pipe 210, 22 ft for second pipe 212, 25 ft for third pipe 214, 30 ft for fourth pipe 216, and 27 ft for fifth pipe 218. As mentioned before, not all pipes of a given diameter may be the same length, therefore to improve identification of the position of collars 126, small variation of the length of each pipe may be utilized to further maximize the sum in Equation (1) or it could be visually checked in case the pattern is visually discernible.

Figure 13:
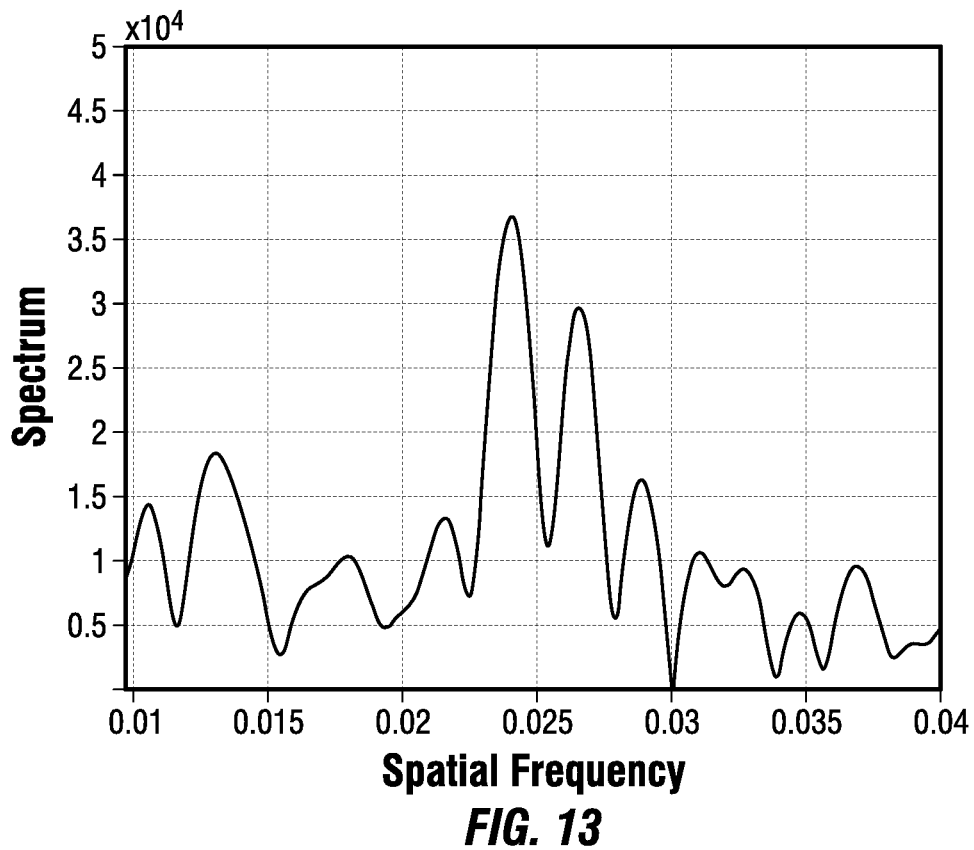
FIG. 13 illustrates the Fourier transform of the late time response of a PEC tool, logging three concentric pipes.

FIG. 13 shows the Fourier transform of the late time response of a PEC tool, in an example, logging three concentric pipes. In this example, the period of collars 126 on first pipe 210 may be approximately 42 ft (13 m) and period of collars 126 on second pipe 212 and third pipe 214 may be the same, approximately 38 ft (12 m). In the spectrum, with ignoring the low frequency peaks related to DC value of the response, the largest high frequency peak may relate to the periodicity of collars 126 on first pipe 210 and the second high frequency peak may be related to the periodicity of collars 126 on second pipe 212 and third pipe 214.

Figure 14:
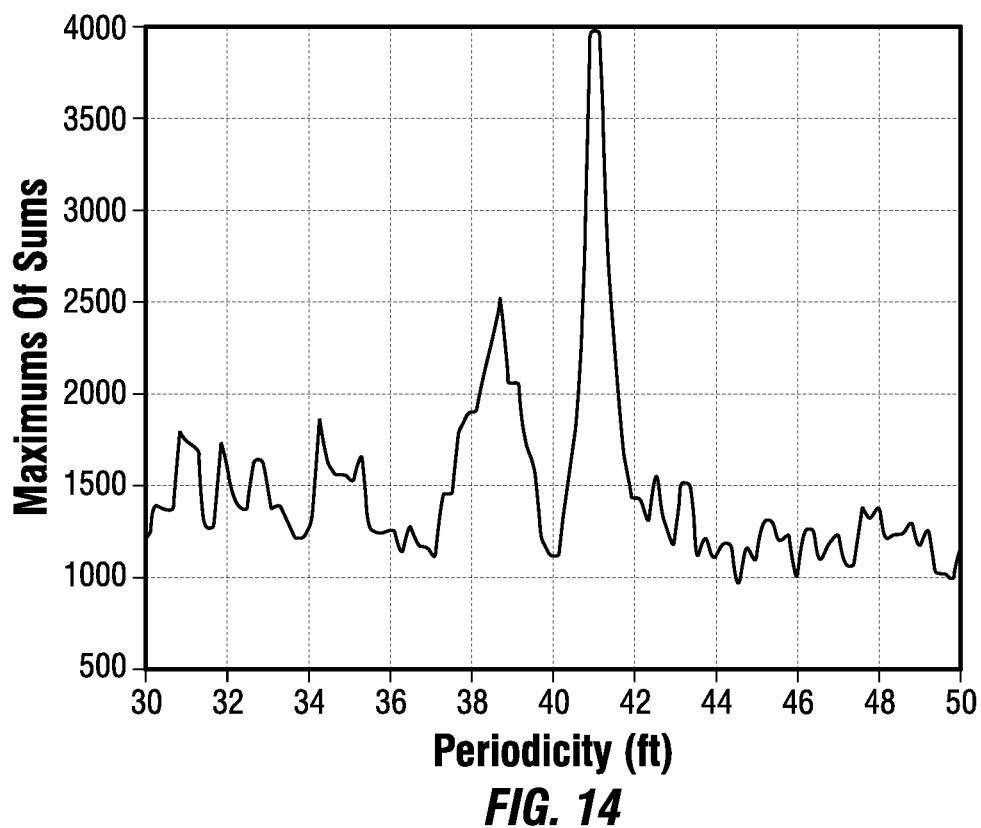
FIG. 14 shows maximums of the Equation (1) computed for various assumed values for the periodicity.

In an illustrative example, FIG. 14 shows maximums of Equation (1) computed for various assumed values for the periodicity. A reliable estimate of the periodicities of collars 126 on the multiple pipes may be obtained from considering the common peaks in both FIG. 13 and FIG. 14. This may allow for disregarding the spurious peaks observed in each one that may lead to errors in estimating the periodicities of collars 126.

Figure 15A:
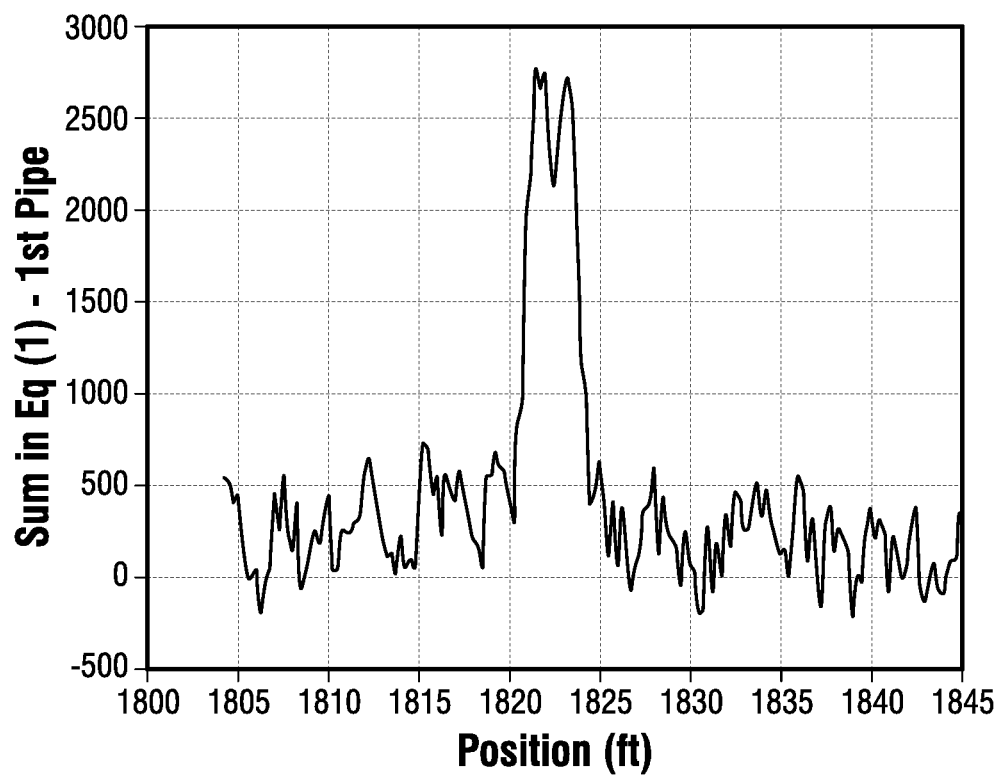
FIGS. 15A and 15B show the distributions of computed values from Equation (1) to find the offset positions of the collars on each pipe after finding the periodicity of the collars.
Figure 15B:
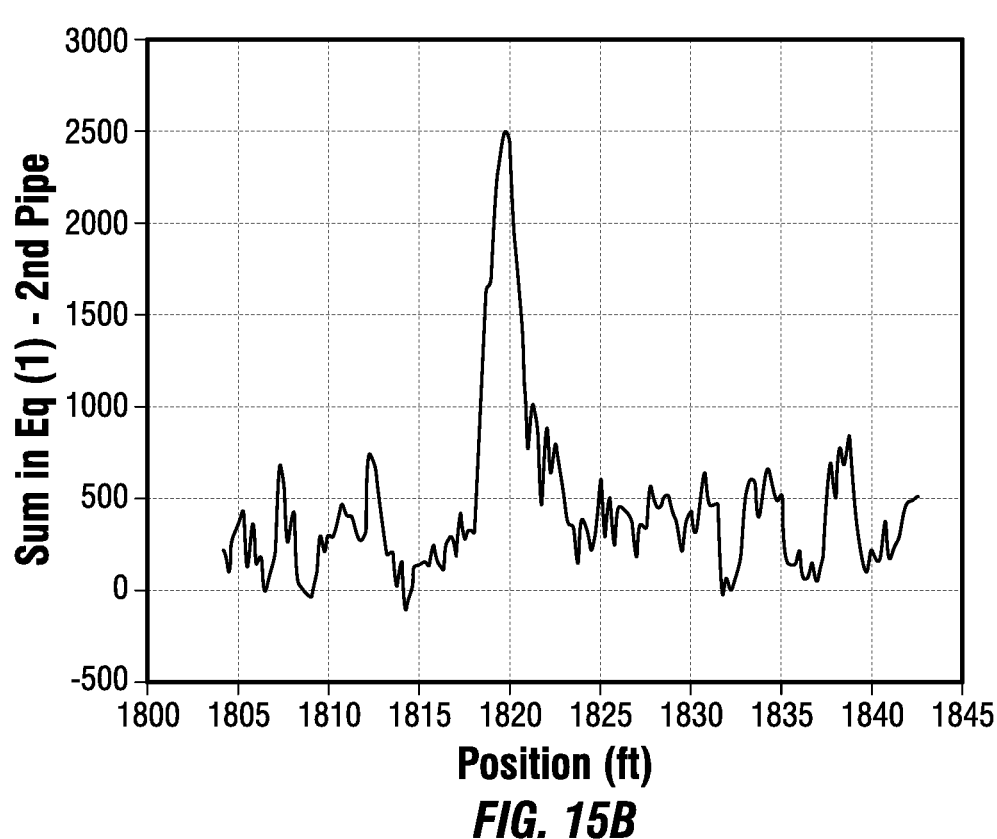

In an illustrated example, FIGS. 15A and 15B show the variation of the sum in Equation (1) when the periods are obtained from the spectrum in FIG. 13 and variation in FIG. 14. The location of first collar 128 (referring to FIG. 1) for first pipe 210 may be estimated to be almost 18.5 ft. from the beginning of the pipe, the location of the first collar 128 for second pipe 212 may be estimated to be almost 20 ft. from the beginning of the pipe, and the location of the first collar 128 for third pipe 214 may be estimated to be at 25 ft. from the beginning of the pipe. The method described in the figures may be automated easily and may lead to a faster and more efficient way to find the position of collars 126.

This disclosure may include any of the various features of the compositions, methods, and systems disclosed herein, including one or more of the following features in any combination.

Statement 1: A method for locating a collar comprising: disposing a logging tool within a plurality of concentric pipes in a wellbore; measuring one or more wellbore parameters; creating a corrosion detection tool log from the measuring one or more wellbore parameters; processing the corrosion detection tool log to determine a location and a position of a plurality of collars on the concentric pipes; and adjusting the corrosion detection tool log to account for the location and position of the plurality of collars.

Statement 2: The method of statement 1, wherein the processing comprises maximizing $S_{np}(j)$ from the equation as set forth below:

$$S_{nr,nf}{}^{np}(j) = \Sigma_n R_{nr,nf}(j\Delta z + nT_{np})\ n=0,\ldots,N$$

to determine a first collar, wherein T varies over a finite range and n varies within a finite range, np (np=1, . . . ,Np) is defined as individual pipes, $S^{np}(j)$ is a sum of responses, $R_{nr,nf}$ is a receiver, nr is an index corresponding to the number of receiver, nf is an index corresponding to the number of frequency, $T_{np}$ is defined as a plurality of samples with periodicity, $j\Delta z$ is defined as a well location, wherein j is an integer that varies between j=1, . . . M, and M is the total number of logging points.

Statement 3: The method of statement 1 or statement 2, wherein the processing comprises applying a Fourier transform to a signal from the one or more wellbore parameters in the corrosion detection tool log and extracting a plurality of spatial periods for the plurality of collars located in the wellbore from the Fourier transform.

Statement 4: The method of any preceding statement, further comprising determining a periodicity of the plurality of collars as set forth below:

$$T_{np} = \frac{1}{f_{np}}$$

wherein $T_{np}$ is defined as the periodicity of the plurality of collars and $f_{np}$ is defined as an evaluated frequency.

Statement 5: The method of any preceding statement, wherein $T_{np}$ is defined as $[T_{np}-\Delta T, T_{np}+\Delta T]$ and the periodicity of the plurality of collars is found by determining a maxima for a period and a position of a collar.

Statement 6: The method of any preceding statement, wherein the processing comprising determining a periodicity of the plurality of collars from the corrosion detection tool log.

Statement 7: The method of any preceding statement, wherein the periodicity of the plurality of collars is determined through a visual inspection.

Statement 8: The method of any preceding statement, wherein the processing comprises determining a signature of the plurality of collars on a first pipe of the concentric pipes and subtracting the signature from the corrosion detection tool log to determine a second signal of a second pipe of the concentric pipes.

Statement 9: The method of any preceding statement, wherein the processing comprises determining a location and position of the plurality of collars on an outer pipe of the concentric pipes with a low frequency relative to frequency of an inner pipe.

Statement 10: The method of any preceding statement, wherein the processing comprises determining a location and position of the plurality of collars on an inner pipe of the concentric pipes with a high frequency relative to frequency of an outer pipe.

Statement 11: The method of any preceding statement, wherein the processing comprises performing an inversion to determine the location and the position of the plurality of collars.

Statement 12: The method of any preceding statement, wherein a time-domain response recorded by a receiver is partitioned and averaged over smaller time slots.

Statement 13: The method of any preceding statement, wherein responses averaged over earlier of the time slots correspond to an inner most pipe and responses averaged over later time slots correspond to an outer most pipe.

Statement 14: A system for locating a collar comprising; a conveyance line; a logging tool; and an information handling system capable to measure one or more wellbore parameters; create a corrosion detection tool log from the measurement of the one or more wellbore parameters; extract a location and a position of a plurality of collars using the first collar; and document the location and the position of the plurality of collars.

Statement 15: The system for locating a collar of statement 14, wherein the information handling system is capable to maximize $S_{np}(j)$ from the equation as set forth below:

$$S_{nr,nf}^{np}(j) = \Sigma_n R_{nr,nf}(j\Delta z + nT_{np}) \ n=0, \ldots, N$$

to determine a first collar, wherein T varies over a finite range and n varies within a finite range, np (np=1, . . . ,Np) is defined as individual pipes, $S^{np}(j)$ is a sum of responses, $R_{nr,nf}$ is a receiver, nr is an index corresponding to the number of receiver, nf is an index corresponding to the number of frequency, $T_{np}$ defined as a plurality of samples with periodicity, $j\Delta z$ is defined as a well location, wherein j is an integer that varies between j=1, . . . M, and M is the total number of logging points.

Statement 16: The system for locating a collar of statement 14 or statement 15, wherein the information handling system is capable to determine a periodicity of the plurality of collars as set forth below:

$$T_{np} = \frac{1}{f_{np}}$$

wherein $T_{np}$ is defined as the periodicity of the plurality of collars and $f_{np}$ is defined as an evaluated frequency.

Statement 17: The system for locating a collar of statements 14-16, wherein the logging tool comprises at least one receiver and at least one transmitter.

Statement 18: The system for locating a collar of statements 14-17, wherein the information handling system is capable to produce a low frequency from the logging tool and the information handling system is capable to record the position and the location of the plurality of collars disposed on an outer pipe.

Statement 19: The system for locating a collar of statements 14-18, wherein the information handling system is capable to produce a higher frequency from the logging tool and the information handling system is capable to record the position and the location of the plurality of collars disposed on an inner pipe.

Statement 20: The system for locating a collar of statements 14-19, wherein the information handling system is capable to determine a signature of the plurality of collars on a first and pipe and subtract the signature from the corrosion detection tool log to determine a second signal of a second pipe.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for locating a collar comprising:
disposing a logging tool within a plurality of concentric pipes in a wellbore;
measuring one or more wellbore parameters;
creating a corrosion detection tool log from the measuring one or more wellbore parameters;
processing the corrosion detection tool log to determine a location and a position of a plurality of collars on the plurality of concentric pipes; and
adjusting the corrosion detection tool log to account for the location and position of the plurality of collars on a first pipe and a second pipe of the plurality of concentric pipes.

2. The method of claim 1 wherein the processing comprises maximizing $S_{np}(j)$ from the equation as set forth below:

$$S_{nr,nf}^{np}(j) = \Sigma_n R_{nr,nf}(j\Delta z + nT_{np}) \; n=0,\ldots,N$$

to determine a first collar, wherein T varies over a finite range and n varies within a finite range, np (np=1, ... ,Np) is defined as individual pipes, $S^{np}(j)$ is a sum of responses, $R_{nr,nf}$ is a receiver, nr is an index corresponding to a number of receivers on the logging tool, nf is an index corresponding to number of frequency, $T_{np}$ is defined as a plurality of samples with periodicity, $j\Delta z$ is defined as a well location, wherein j is an integer that varies between j=1, ... M, and M is a total number of logging points.

3. The method of claim 1 wherein the processing comprises applying a Fourier transform to a signal from the one or more wellbore parameters in the corrosion detection tool log and extracting a plurality of spatial periods for the plurality of collars located in the wellbore from the Fourier transform.

4. The method of claim 3, further comprising determining a periodicity of the plurality of collars as set forth below:

$$T_{np} = \frac{1}{f_{np}}$$

wherein $T_{np}$ is defined as the periodicity of the plurality of collars and $f_{np}$ is defined as an evaluated frequency.

5. The method of claim 4, wherein $T_{np}$ is defined as $[T_{np}-\Delta T, T_{np}+\Delta T]$ and the periodicity of the plurality of collars is found by determining a maxima for a period and a position of a collar.

6. The method of claim 1, wherein the processing comprising determining a periodicity of the plurality of collars from the corrosion detection tool log.

7. The method of claim 6, wherein the periodicity of the plurality of collars is determined through a visual inspection.

8. The method of claim 1, wherein the processing comprises determining a signature of the plurality of collars on a first pipe of the concentric pipes and subtracting the signature from the corrosion detection tool log to determine a second signal of a second pipe of the concentric pipes.

9. The method of claim 1, wherein the processing comprises determining a location and position of the plurality of collars on an outer pipe of the concentric pipes with a low frequency relative to frequency for an inner pipe.

10. The method of claim 1, wherein the processing comprises determining a location and position of the plurality of collars on an inner pipe of the concentric pipes with a high frequency relative to frequency for an outer pipe.

11. The method of claim 1, wherein the processing comprises performing an inversion to determine the location and the position of the plurality of collars.

12. The method of claim 1, wherein a time-domain response recorded by a receiver is partitioned and averaged over smaller time slots.

13. The method of claim, 12, wherein responses averaged over earlier of the time slots correspond to an inner most pipe and responses averaged over later time slots correspond to an outer most pipe.

14. A system for locating a collar comprising;
a conveyance line;
a logging tool; and
an information handling system capable to measure one or more wellbore parameters; create a corrosion detection tool log from the measurement of the one or more wellbore parameters; extract a location and a position of a plurality of collars on a first pipe and a second pipe of a plurality of concentric pipes using a first collar on the first pipe and the second pipe;
and document the location and the position of the plurality of collars.

15. The system for locating a collar of claim 14, wherein the information handling system is capable to maximize $S_{np}(j)$ from the equation as set forth below:

$$S_{nr,nf}^{np}(j) = \Sigma_n R_{nr,nf}(j\Delta z + nT_{np}) \; n=0,\ldots,N$$

to determine a first collar, wherein T varies over a finite range and n varies within a finite range, np (np=1, ... ,Np) is defined as individual pipes, $S^{np}(j)$ is a sum of responses, $R_{nr,nf}$ is a receiver, nr is an index corresponding to the number of receiver, nf is an index corresponding to the number of frequency, $T_{np}$ is defined as a plurality of samples with periodicity, $j\Delta z$ is defined as a well location, wherein j is an integer that varies between j=1, ... M and M is the total number of logging points.

16. The system for locating a collar of claim 14, wherein the information handling system is capable to determine a periodicity of the plurality of collars as set forth below:

$$T_{np} = \frac{1}{f_{np}}$$

wherein $T_{np}$ is defined as the periodicity of the plurality of collars and $f_{np}$ is defined as an evaluated frequency.

17. The system for locating a collar of claim 14, wherein the logging tool comprises at least one receiver and at least one transmitter.

18. The system of locating a collar of claim 14, wherein the information handling system is capable to produce a low frequency from the logging tool and the information handling system is capable to record the position and the location of the plurality of collars disposed on an outer pipe.

19. The system of locating a collar of claim 14, wherein the information handling system is capable to produce a higher frequency from the logging tool and the information handling system is capable to record the position and the location of the plurality of collars disposed on an inner pipe.

20. The system of locating a collar of claim 14, wherein the information handling system is capable to determine a signature of the plurality of collars on a first and pipe and subtract the signature from the corrosion detection tool log to determine a second signal of a second pipe.

21. A method for locating a collar comprising:
disposing a logging tool within a plurality of concentric pipes in a wellbore;
measuring one or more wellbore parameters;
creating a corrosion detection tool log from the measuring one or more wellbore parameters;
processing the corrosion detection tool log to determine a location and a position of a plurality of collars on the concentric pipes, wherein the processing comprises maximizing $S_{np}(j)$ from the equation as set forth below:

$$S_{nr,nf}^{np}(j)=\Sigma_n R_{nr,nf}(j\Delta z+nT_{np}) \ n=0,\ldots,N$$

to determine a first collar, wherein T varies over a finite range and n varies within a finite range, np (np=1, . . . ,Np) is defined as individual pipes, $S^{np}(j)$ is a sum of responses, $R_{nr,nf}$ is a receiver, nr is an index corresponding to a number of receivers on the logging tool, nf is an index corresponding to number of frequency, $T_{np}$ is defined as a plurality of samples with periodicity, $j\Delta z$ is defined as a well location, wherein j is an integer that varies between j=1, . . . M, and M is a total number of logging points; and
adjusting the corrosion detection tool log to account for the location and position of the plurality of collars.

22. A method for locating a collar comprising:
disposing a logging tool within a plurality of concentric pipes in a wellbore;
measuring one or more wellbore parameters;
creating a corrosion detection tool log from the measuring one or more wellbore parameters;
processing the corrosion detection tool log to determine a location and a position of a plurality of collars on the concentric pipes, wherein the processing comprises maximizing $S_{np}(j)$ from the equation as set forth below:

$$S_{nr,nf}^{np}(j)=\Sigma_n R_{nr,nf}(j\Delta z+nT_{np}) \ n=0,\ldots,N$$

to determine a first collar, wherein T varies over a finite range and n varies within a finite range, np (np=1, . . . ,Np) is defined as individual pipes, $S^{np}(j)$ is a sum of responses, $R_{nr,nf}$ is a receiver, nr is an index corresponding to a number of receivers on the logging tool, nf is an index corresponding to number of frequency, $T_{np}$ is defined as a plurality of samples with periodicity, $j\Delta z$ is defined as a well location, wherein j is an integer that varies between j=1, . . . M, and M is a total number of logging points;
adjusting the corrosion detection tool log to account for the location and position of the plurality of collars; and
determining a periodicity of the plurality of collars as set forth below:

$$T_{np} = \frac{1}{f_{np}}$$

wherein $T_{np}$ is defined as the periodicity of the plurality of collars and $f_{np}$ is defined as an evaluated frequency.

23. A method for locating a collar comprising:
disposing a logging tool within a plurality of concentric pipes in a wellbore;
measuring one or more wellbore parameters;
creating a corrosion detection tool log from the measuring one or more wellbore parameters;
processing the corrosion detection tool log to determine a location and a position of a plurality of collars on the plurality of concentric pipes; and
processing the corrosion detection tool log to determine a location and a position of a plurality of collars on the concentric pipes, wherein the processing comprises maximizing $S_{np}(j)$ from the equation as set forth below:

$$S_{nr,nf}^{np}(j)=\Sigma_n R_{nr,nf}(j\Delta z+nT_{np}) \ n=0,\ldots,N$$

to determine a first collar, wherein T varies over a finite range and n varies within a finite range, np (np=1, . . . ,Np) is defined as individual pipes, $S^{np}(j)$ is a sum of responses, $R_{nr,nf}$ is a receiver, nr is an index corresponding to a number of receivers on the logging tool, nf is an index corresponding to number of frequency, $T_{np}$ is defined as a plurality of samples with periodicity, $j\Delta z$ is defined as a well location, wherein j is an integer that varies between j=1, . . . M, and M is a total number of logging points;
adjusting the corrosion detection tool log to account for the location and position of the plurality of collars; and
determining a periodicity of the plurality of collars as set forth below:

$$T_{np} = \frac{1}{f_{np}}$$

wherein $T_{np}$ is defined as the periodicity of the plurality of collars and $f_{np}$ is defined as an evaluated frequency and wherein $T_{np}$ is defined as $[T_{np}-\Delta T, T_{np}+\Delta T]$ and the periodicity of the plurality of collars is found by determining a maxima for a period and a position of a collar.

24. A system for locating a collar comprising;
a conveyance line;
a logging tool; and
an information handling system capable to measure one or more wellbore parameters;
create a corrosion detection tool log from the measurement of the one or more wellbore parameters;
extract a location and a position of a plurality of collars using a first collar; and document the location and the position of the plurality of collars; and
maximize $S_{np}(j)$ from the equation as set forth below:

$$S_{nr,nf}^{np}(j)=\Sigma_n R_{nr,nf}(j\Delta z+nT_{np}) \ n=0,\ldots,N$$

to determine a first collar, wherein T varies over a finite range and n varies within a finite range, np (np=1, . . . ,Np) is defined as individual pipes, $S^{np}(j)$ is a sum of responses, $R_{nr,nf}$ is a receiver, nr is an index corresponding to the number of receiver, nf is an index corresponding to the number of frequency, $T_{np}$ is defined as a plurality of samples with periodicity, $j\Delta z$ is defined as a well location, wherein j is an integer that varies between j=1, ... M, and M is the total number of logging points.

25. A system for locating a collar comprising;
a conveyance line;
a logging tool; and
an information handling system capable to measure one or more wellbore parameters;
create a corrosion detection tool log from the measurement of the one or more wellbore parameters;
extract a location and a position of a plurality of collars using a first collar; and
document the location and the position of the plurality of collars;
maximize $S_{np}(j)$ from the equation as set forth below:

$$S_{nr,nf}^{np}(j) = \Sigma_n R_{nr,nf}(j\Delta z + nT_{np}) \quad n=0, \ldots, N$$

to determine a first collar, wherein T varies over a finite range and n varies within a finite range, np (np=1, ... ,Np) is defined as individual pipes, $S^{np}(j)$ is a sum of responses, $R_{nr,nf}$ is a receiver, nr is an index corresponding to the number of receiver, nf is an index corresponding to the number of frequency, $T_{np}$ is defined as a plurality of samples with periodicity, $j\Delta z$ is defined as a well location, wherein j is an integer that varies between j=1, ... M and M is the total number of logging points; and
determine a periodicity of the plurality of collars as set forth below:

$$T_{np} = \frac{1}{f_{np}}$$

wherein $T_{np}$ is defined as the periodicity of the plurality of collars and $f_{np}$ is defined as an evaluated frequency.

* * * * *